US012724218B2

(12) United States Patent
Donchev et al.

(10) Patent No.: US 12,724,218 B2
(45) Date of Patent: Sep. 1, 2026

(54) DEVICE FOR PROVIDING ENHANCED OPTICAL FIBER CABLE CONNECTIVITY AND MANAGEMENT IN A FIBER DISTRIBUTION ASSEMBLY

(71) Applicant: PPC BROADBAND, INC., East Syracuse, NY (US)

(72) Inventors: Stefan Donchev, Milton Keynes (GB); Afzal V. Abdulsalam, Ernakulam (IN); Sreekumar Ponnath, Palakkad (IN)

(73) Assignee: PPC BROADBAND, INC., East Syracuse, NY (US)

(*) Notice: Subject to any disclaimer, the term of this patent is extended or adjusted under 35 U.S.C. 154(b) by 180 days.

(21) Appl. No.: 18/387,103

(22) Filed: Nov. 6, 2023

(65) Prior Publication Data

US 2024/0151924 A1 May 9, 2024

Related U.S. Application Data

(60) Provisional application No. 63/422,888, filed on Nov. 4, 2022.

(51) Int. Cl.
*G02B 6/00* (2006.01)
*G02B 6/44* (2006.01)

(52) U.S. Cl.
CPC ....... *G02B 6/4454* (2013.01); *G02B 6/44528* (2023.05)

(58) Field of Classification Search
CPC ......................... G02B 6/4454; G02B 6/44528; G02B 6/4455; G02B 6/00
See application file for complete search history.

(56) References Cited

U.S. PATENT DOCUMENTS 6,438,310 B1 8/2002 Lance et al.
10,031,305 B2 * 7/2018 Leeman ............... G02B 6/4455
(Continued)

FOREIGN PATENT DOCUMENTS

WO 2021156389 A1 8/2021

OTHER PUBLICATIONS

International Search Report and Written Opinion dated Feb. 23, 2024 in corresponding International Application No. PCT/US2023/036835, 14 pages.

*Primary Examiner* — Jennifer Doan
(74) *Attorney, Agent, or Firm* — MH2 TECHNOLOGY LAW GROUP LLP; Stuart I. Smith

(57) ABSTRACT

An optical fiber cassette structurally configured to enhance fiber management in an optical fiber management system includes: a first cassette portion; and a second cassette portion structurally configured to be removably coupled with the first cassette portion. The second cassette portion is structurally configured to be coupled with the first cassette portion in different orientations; the first cassette portion is structurally configured to be coupled with an alternate second cassette portion that is structurally configured to be removably coupled with the first cassette portion; and the first cassette portion is structurally configured to alternatively and removably receive the second cassette portion and the alternate second cassette portion in a selected orientation such that the first cassette portion, the second cassette portion, and the alternate second cassette portion provide a modular system that permits customization of the cassette so as to enhance optical fiber cable connection and management.

28 Claims, 19 Drawing Sheets

(56) References Cited

U.S. PATENT DOCUMENTS

| | | | | |
|---|---|---|---|---|
| 10,393,981 | B2 * | 8/2019 | Allen .................. | G02B 6/4447 |
| 2003/0007767 | A1 | 1/2003 | Douglas et al. | |
| 2013/0039629 | A1 | 2/2013 | Krampotich et al. | |
| 2016/0070081 | A1 | 3/2016 | Chen et al. | |

* cited by examiner

DEVICE FOR PROVIDING ENHANCED OPTICAL FIBER CABLE CONNECTIVITY AND MANAGEMENT IN A FIBER DISTRIBUTION ASSEMBLY

CROSS-REFERENCE TO RELATED APPLICATION

This application claims the benefit of U.S. Provisional Application No. 63/422,888 filed Nov. 4, 2022, the disclosure of which is hereby incorporated by reference herein in its entirety.

BACKGROUND

The present invention relates generally to optical fiber cable management. More particularly, the present invention relates to a system for fixing and storing optical fiber cables in an optical fiber cable management system using connectorized cables.

Conventional systems do not provide cable management modules or cassettes that receive cables terminated with connectors and, as a result, do not provide features that facilitate handling connectorized cables.

There is a need for scalable, compact splicing and patching system, for example, a system that is compact and cost effective and can be used for fiber termination and distribution in all areas of the fiber architecture. It may be desirable to provide systems that organize and store optical fibers before and after the splicing of the optical fibers, where the incoming optic fibers are connectorized. It may be desirable to provide a system combining a compact and scalable splice tray for fiber termination and distribution with connectorized functionality of the cassette to eliminate a need for a separate patching system.

SUMMARY

Embodiments include a cassette having a base portion that is structurally configured to alternatively and removably receive an adapter portion and an alternate adapter portion in a selected orientation such that the base portion, the adapter portion, and the alternate adapter portion provide a modular system that permits customization of the cassette so as to enhance optical fiber cable connection and management.

The present disclosure provides a much needed connectorized functionality for optical fiber management systems. Embodiments of the disclosure are compatible with particular back plates, which allows mix-and-match, easy migration and upgrades. Embodiments include pivoting cassettes to facilitate access and permitting different cassettes in the same platform. Embodiments combine the compactness and scalability of a splice system with connectorized functionality and can be used in many applications, thus removing the need for a separate patching system, when this functionality is required.

Embodiments add a range of splice and patch cassettes to modular systems. These cassettes allow patching of pre-terminated cables in a splice trays "stack", thus greatly reducing the overall space requirements and cost of deployment. Embodiments provide systems that can be populated with either the non-connectorized splice/patch trays, or connectorized splice/patch trays, or a combination of both.

Embodiments include single and double depth cassettes, to accommodate, for example, 6SC/12LC and 12SC/24LC connectors, respectively. Each of these cassettes has a wide range of variants, including but not limited to: splice and patch with stranded or ribbon fibers; patch only for pre-terminated fibers; loaded with fan-outs; and loaded with a wide range of planar lightwave circuit ("PLC") splitters, fused biconic taper ("FBT") splitters and wavelength division multiplexing ("xWDM") devices.

Embodiments include the overall functionality and combination of some or all features in a single, coherent product including patching functionality that is a part of a scalable splicing system. Embodiments include: use of connectorized systems in a "flip" type system, which provides easy access to the connectors; a double fiber channel on the back of the cassettes—one for the incoming fibers and another for patch cords; and an installation system that allows the cassettes to be installed on a modular platform, or as a completely stand-alone product and still retain the functionality of splicing and patching.

Embodiments include an optical fiber cassette structurally configured to enhance fiber management in an optical fiber management system, having: a base portion that may be structurally configured to receive fiber optic cables; an adapter portion that may be structurally configured to be removably coupled with the base portion; a splice tray that may be structurally configured to be mounted to the base portion and structurally configured to be movable between an open position and a closed position; and a cable routing portion that may be structurally configured to be removably attached to the base portion. The base portion may be structurally configured to attach to the cable routing portion at multiple locations on the base portion; the base portion may be structurally configured to be coupled with a cassette mount such that the cassette pivots relative to the cassette mount; the adapter portion includes a first configuration of ports that are structurally configured to receive fiber optic connectors; the adapter portion may comprise an input adapter to optically connect an internal input connector of the fiber optic connectors to an external input connector of the fiber optic connectors; the adapter portion may be structurally configured to be coupled with the base portion in different orientations; the base portion may be structurally configured to be coupled with an alternate adapter portion that is structurally configured to be removably coupled with the base portion, and that includes a second configuration of ports that are structurally configured to receive fiber optic connectors; the second configuration may be different from the first configuration; and the base portion may be structurally configured to alternatively and removably receive the adapter portion and the alternate adapter portion in a selected orientation such that the base portion, the adapter portion, and the alternate adapter portion provide a modular system that permits customization of the cassette so as to enhance optical fiber cable connection and management.

Embodiments include an optical fiber management system configured to secure incoming and outgoing connectorized optical cables containing optical fibers, separate and route the optical fibers, organize splicing of the optical fibers, and provide access to the optical fibers before and after splicing, the system having: a cable fixation plate; a fiber entry and storage plate located above and attached to the cable fixation plate; a cassette mount located above and structurally configured to be attached to the fiber entry and storage plate, the cassette mount having attachment members structurally configured to receive a plurality of cassettes; and a cassette. The cassette having: a base portion that may be structurally configured to receive fiber optic cables; an adapter portion that may be structurally configured to be removably coupled with the base portion; a splice tray that may be structurally configured to be mounted to the base portion and structurally configured to be movable between an open position and a closed position; and a cable routing portion that may be structurally configured to be removably attached to the base portion. The base portion may be structurally configured to attach to the cable routing portion at multiple locations on the base portion; the base portion may be structurally configured to be coupled with a cassette mount such that the cassette pivots relative to the cassette mount; the adapter portion may include a first configuration of ports that are structurally configured to receive fiber optic connectors; the adapter portion may comprise an input adapter to optically connect an internal input connector of the fiber optic connectors to an external input connector of the fiber optic connectors; the adapter portion may be structurally configured to be coupled with the base portion in different orientations; the base portion may be structurally configured to be coupled with an alternate adapter portion that is structurally configured to be removably coupled with the base portion, and that includes a second configuration of ports that are structurally configured to receive fiber optic connectors; the second configuration may be different from the first configuration; and the base portion may be structurally configured to alternatively and removably receive the adapter portion and the alternate adapter portion in a selected orientation such that the base portion, the adapter portion, and the alternate adapter portion provide a modular system that permits customization of the cassette so as to enhance optical fiber cable connection and management.

In particular embodiments, the adapter portion may comprise an output adapter to optically connect an internal output connector to an external output connector.

In particular embodiments, the different orientations may include a left-hand orientation and a right-hand orientation.

In particular embodiments, the cassette further comprises a cover that may be structurally configured to be mounted to the base portion and may be structurally configured to be movable between an open position and a closed position.

In particular embodiments, the base portion may be structurally configured to alternately receive first adapter portion in a first orientation and a second orientation, wherein the second orientation is 180 degrees relative to the first orientation.

In particular embodiments, the adapter portion may be structurally configured to receive an external one of the fiber optic connectors at an angle relative to a longitudinal direction of first adapter portion, wherein the angle is between 0 and 90 degrees.

In particular embodiments, the adapter portion may be structurally configured to receive an internal one of the fiber optic connectors at the angle relative to the longitudinal direction of the adapter portion.

Embodiments include an optical fiber cassette structurally configured to enhance fiber management in an optical fiber management system, having: a base portion that may be structurally configured to receive fiber optic cables; an adapter portion structurally that may be configured to be removably coupled with the base portion; and a splice tray that may be structurally configured to be mounted to the base portion and structurally configured to be movable between an open position and a closed position. The base portion may be structurally configured to be coupled with a cassette mount such that the cassette pivots relative to the cassette mount; the adapter portion may be structurally configured to receive fiber optic connectors; the adapter portion may be structurally configured to be coupled with the base portion in different orientations; the base portion may be structurally configured to be coupled with an alternate adapter portion that may be structurally configured to be removably coupled with the base portion, and that may include a second configuration of ports that are structurally configured to receive fiber optic connectors; the second configuration may be different from the first configuration; and the base portion may be structurally configured to alternatively and removably receive the adapter portion and the alternate adapter portion in a selected orientation such that the base portion, the adapter portion, and the second adapter portion provide a modular system that permits customization of the cassette so as to enhance optical fiber cable connection and management.

In particular embodiments, the cassette further comprises a cable routing portion that may be structurally configured to be removably attached to the base portion.

In particular embodiments, the base portion may be structurally configured to attach to the cable routing portion at multiple locations on the base portion.

In particular embodiments, the adapter portion comprises an input adapter to optically connect an internal input connector of the fiber optic connectors to an external input connector of the fiber optic connectors.

In particular embodiments, the internal input connector terminates an internal input optical cable that may be located inside the base portion.

In particular embodiments, the adapter portion comprises an output adapter to optically connect an internal output connector of the fiber optic connectors to an external output connector of the fiber optic connectors.

In particular embodiments, the internal output connector may terminate an internal output optical cable that is located inside the base portion.

In particular embodiments, the cassette base may be structurally configured to alternately receive the adapter portion in a first orientation and a second orientation, wherein the second orientation is 180 degrees relative to the first orientation.

In particular embodiments, the adapter portion may be structurally configured to receive one of the optical fiber connectors at an angle relative to a longitudinal direction of the adapter plate, wherein the angle is between 0 and 90 degrees.

Embodiments include an optical fiber cassette structurally configured to enhance fiber management in an optical fiber management system, having: a first cassette portion that may be structurally configured to receive fiber optic cables; and a second cassette portion that may be structurally configured to be removably coupled with the first cassette portion. The second cassette portion may be structurally configured to be coupled with the first cassette portion in different orientations; the first cassette portion may be structurally configured to be coupled with an alternate second cassette portion that may be structurally configured to be removably coupled with the first cassette portion; and the first cassette portion may be structurally configured to alternatively and removably receive the second cassette portion and the alternate second cassette portion in a selected orientation such that the first cassette portion, the second cassette portion, and the alternate second cassette portion provide a modular system that permits customization of the cassette so as to enhance optical fiber cable connection and management.

In particular embodiments, the cassette may further comprises a splice tray that may be structurally configured to be mounted to the first cassette portion and structurally configured to be movable between an open position and a closed position.

In particular embodiments, the first cassette portion may be structurally configured to be coupled with a cassette mount such that the cassette pivots relative to the cassette mount.

In particular embodiments, the second cassette portion may be structurally configured to receive fiber optic connectors.

In particular embodiments, the first cassette portion may be a cassette base portion.

In particular embodiments, the second cassette portion may be an adapter portion.

In particular embodiments, the second cassette portion may be structurally configured to receive an internal input connector terminating an internal input optical cable.

In particular embodiments, the second cassette portion may comprise an input adapter to optically connect the internal input connector to an external input connector.

In particular embodiments, the first cassette portion may be structurally configured to alternately receive the second cassette portion in a first orientation and a second orientation, wherein the second orientation is 180 degrees relative to the first orientation.

In particular embodiments, the second cassette portion may be structurally configured to receive an external input connector at an angle relative to a longitudinal direction of the second cassette portion, wherein the angle is between 0 and 90 degrees.

In particular embodiments, the cassette may further comprise a cable routing portion, the cable routing portion may be structurally configured to removably attach to the first cassette portion, and the first cassette portion may be structurally configured to attach to the cable routing portion at multiple locations on the first cassette portion.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments include a cassette having a base portion that is structurally configured to alternatively and removably receive an adapter portion and an alternate adapter portion in a selected orientation such that the base portion, the adapter portion, and the alternate adapter portion provide a modular system that permits customization of the cassette so as to enhance optical fiber cable connection and management.

Embodiments of the disclosure provide a modular and scalable platform for managing, storage and splicing of optical fibers. Embodiments provide a number of features which separately and together provide significantly better experience during optical fiber routing, optical fiber splicing, and subsequent management and maintenance of the system. Embodiments provide solutions to problems like access to optical fibers, expanding the capacity of the system on demand, and other problems while working with optical cables that are terminated with connectors. Embodiments combine a compact and scalable splice tray for fiber termination and distribution with connectorized functionality of the cassette to eliminate a need for a separate patching system.

Figure 1:
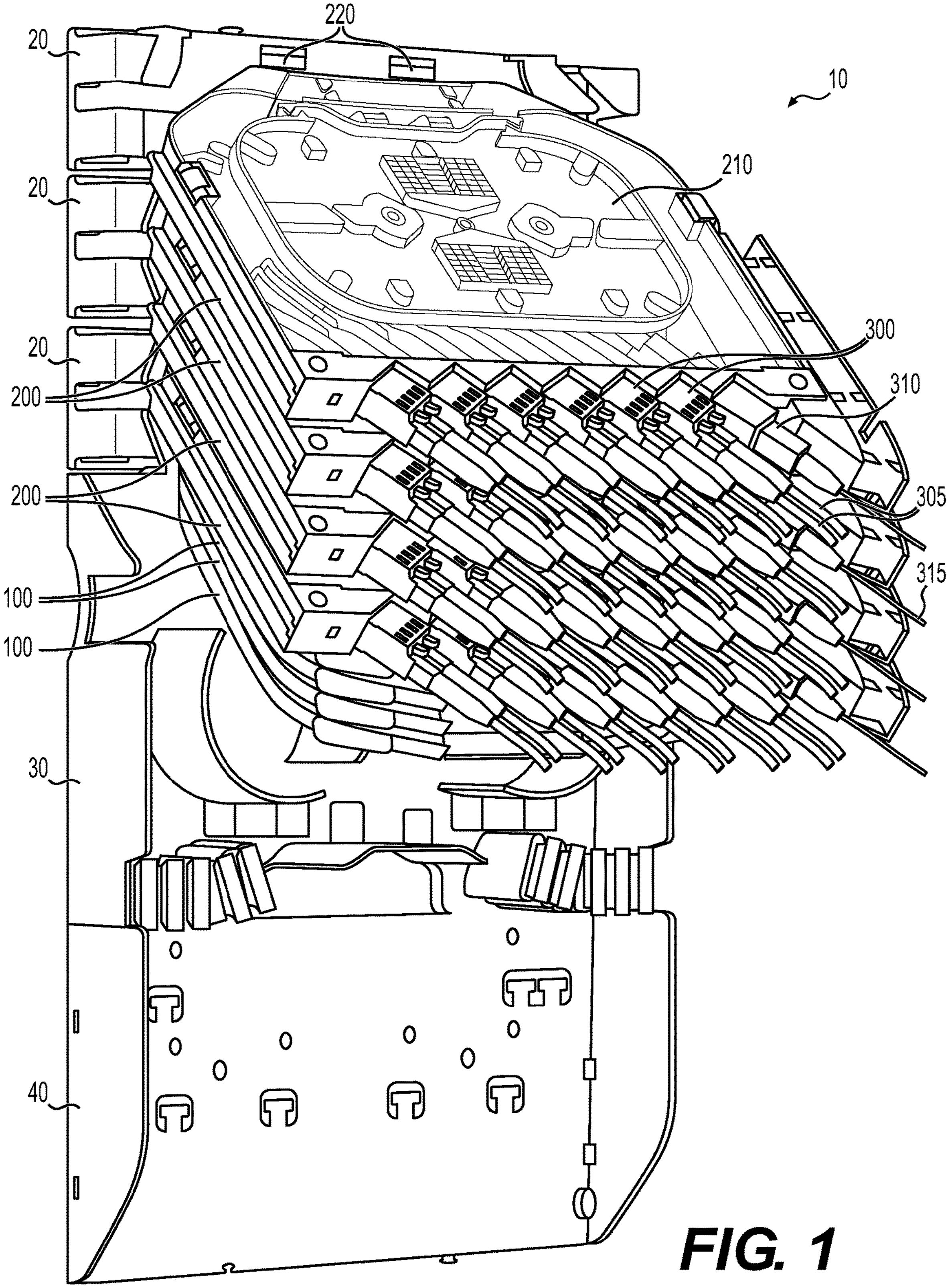
FIG. 1 is a front perspective view of an exemplary cable fixation, entry, storage, and splicing system in accordance with various aspects of the disclosure.
Figure 2:
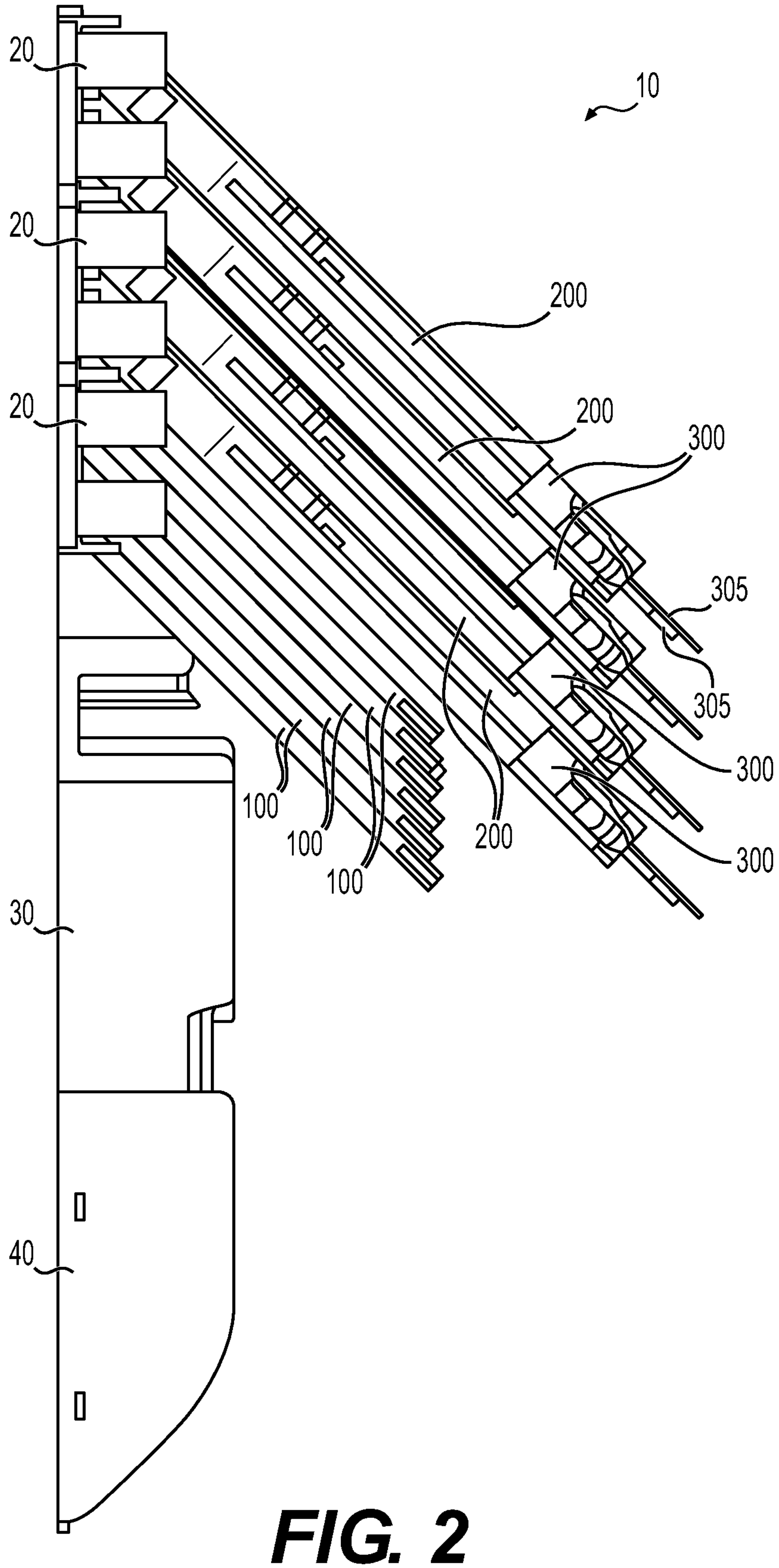
FIG. 2 is a side view of the cable fixation, entry, storage, and splicing system of FIG. 1.

FIGS. 1 and 2 show an exemplary optical fiber cable fixation, entry, storage, and splicing system 10 in accordance with embodiments of the disclosure. System 10 includes, in this example, a plurality of splice tray modules 100 and first management portions, for example, cassettes, 200. In this example, each splice tray module 100 and cassette 200 has a splicing and fiber management area 210, and two connection members 220 that connect splice tray modules 100 and cassettes 200 to a module/cassette mounting plate 20. This example includes three module/cassette mounting plates 20 to which splice tray modules 100 and cassettes 200 are pivotably mounted so that each splice tray module 100 and cassette 200 can be pivoted upward independently from the other splice tray modules 100 and cassettes 200. While this example uses three module/cassette mounting plates 20, other examples use fewer or more than three module/cassette mounting plates 20. This example includes a fiber entry and storage plate 30 that is mounted below, and connected to, a lower-most module/cassette mounting plate 20. This example includes a cable fixation plate 40 mounted below, and connected to, fiber entry and storage plate 30. In this example, each cassette 200 is a single layer management portion, for example, a single layer cassette that is configured to receive a single layer of output connectors 300. In this example, each output connector 300 has two optical cables 305 attached. In this example, each cassette 200 has one input connector 310 that has one input cable 315. The various components of examples of cassette 200 are discussed in detail below.

Figure 3:
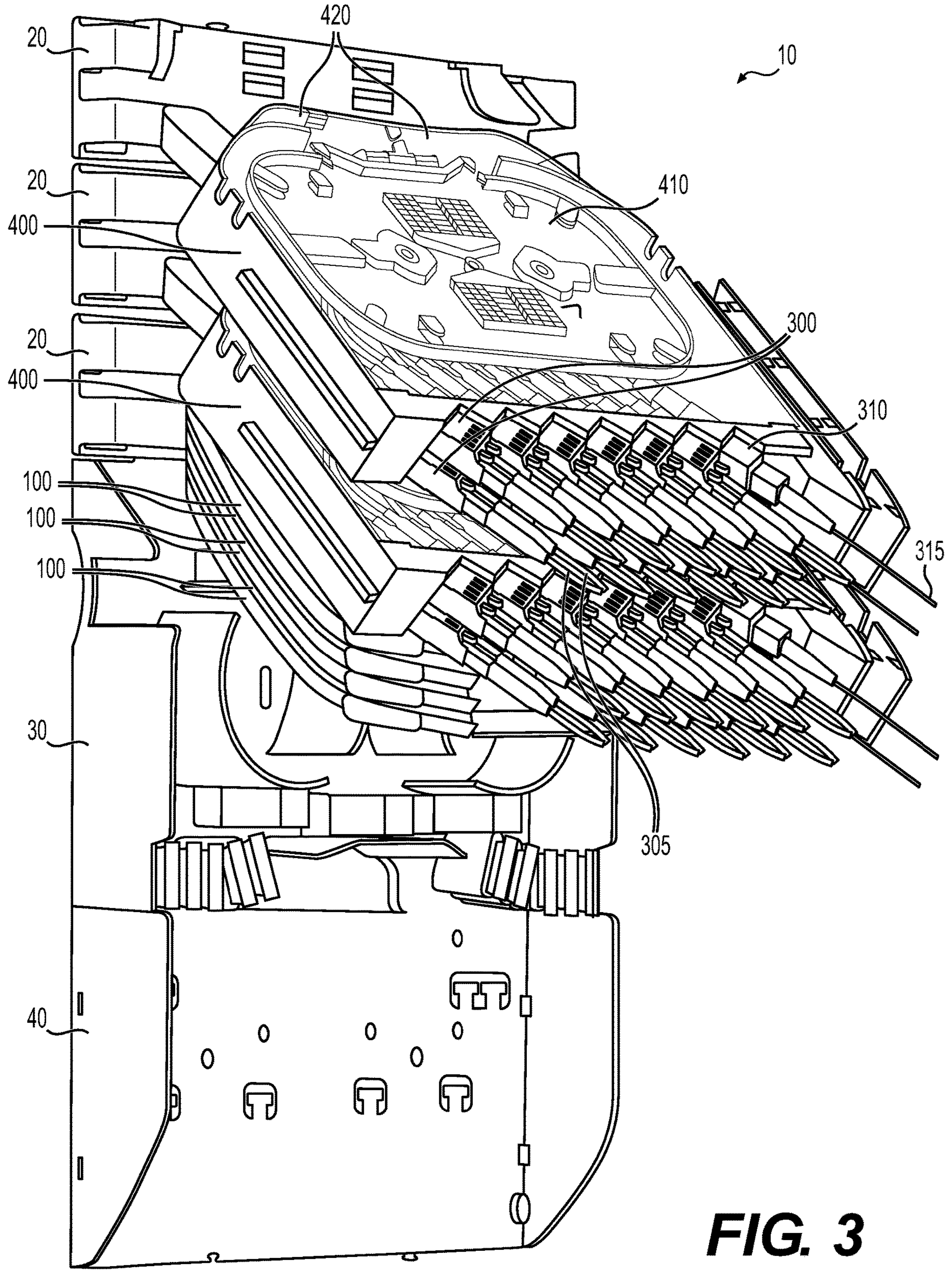
FIG. 3 is a front perspective view of an exemplary cable fixation, entry, storage, and splicing system in accordance with various aspects of the disclosure.
Figure 4:
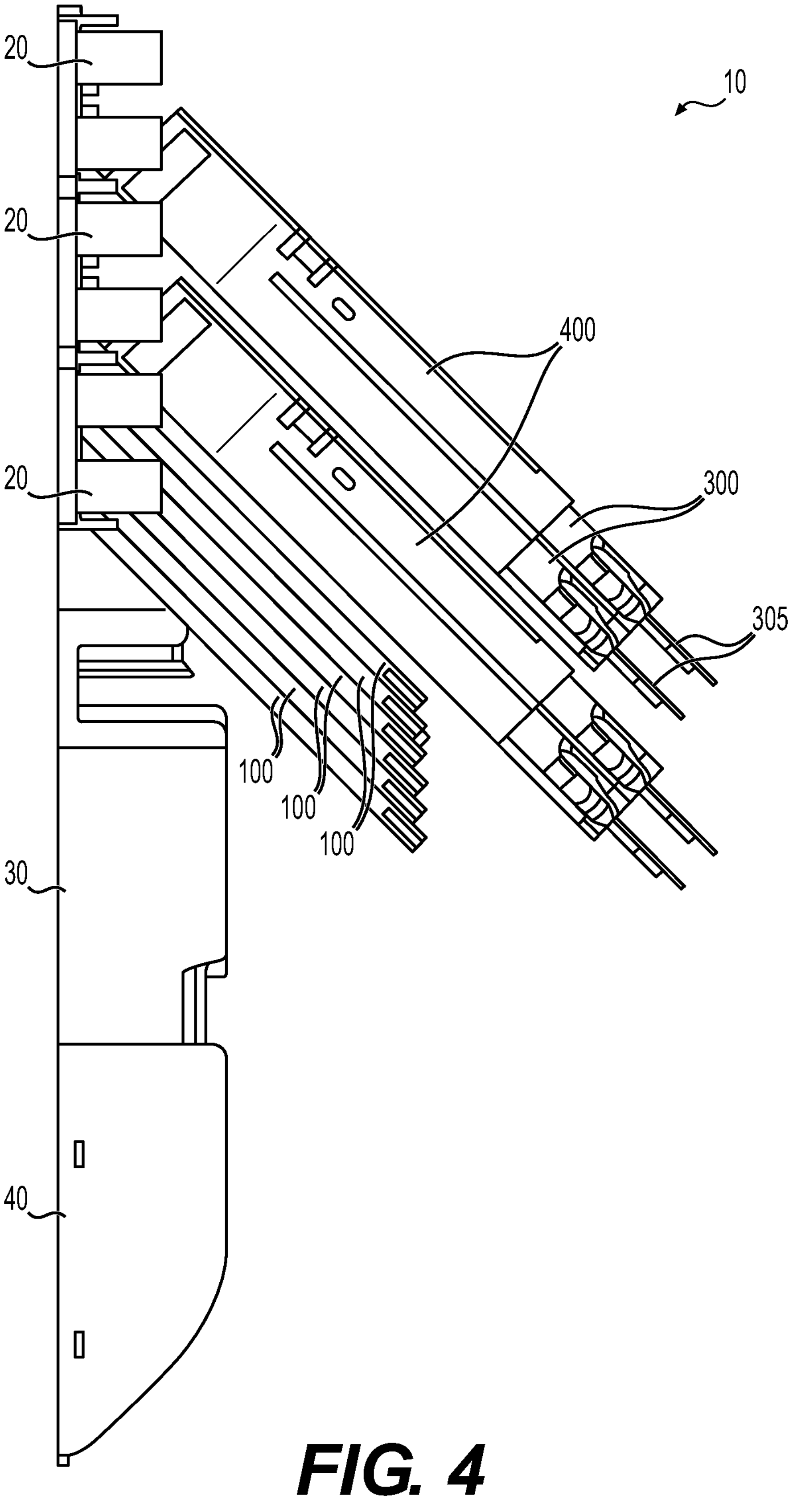
FIG. 4 is a side view of the cable fixation, entry, storage, and splicing system of FIG. 3.

FIGS. 3 and 4 show an exemplary optical fiber cable fixation, entry, storage, and splicing system 10 in accordance with embodiments of the disclosure. System 10 includes, in this example, a plurality of splice tray modules 100 and management portions, for example, cassettes, 400. In this example, each splice tray module 100 and cassette 400 has a splicing and fiber management area 410, and two connection members 420 that connect splice tray modules 100 and cassettes 400 to a module/cassette mounting plate 20. This example includes three module/cassette mounting plates 20 to which splice tray modules 100 and cassettes 400 are pivotably mounted so that each splice tray module 100 and cassette 400 can be pivoted upward independently from the other splice tray modules 100 and cassettes 400. While this example uses three module/cassette mounting plates 20, other examples use fewer or more than three module/cassette mounting plates 20. This example includes a fiber entry and storage plate 30 that is mounted below, and connected to, a lower-most module/cassette mounting plate 20. This example includes a cable fixation plate 40 mounted below, and connected to, fiber entry and storage plate 30. In this example, a first management portion, for example, a cassette 400 is a double layer management portion, for example, a double layer cassette that is configured to receive two layers of output connectors 300. In this example, each output connector 300 has two optical cables 305 attached. In this example, each cassette 400 has two input connectors 310 that each has one input cable 315. The various components of examples of cassette 400 are discussed in detail below.

In some installment locations, multiple systems 10 are mounted beside each other and/or on top of one another (with or without an intervening mounting plate) to increase density within a cabinet or other panel. For example, a side wall of a first system 10 can be located adjacent to a side wall of another system 10, and/or a base plate of one system 10 can be mounted to an intervening mounting plate that is, in turn attached to a base plate of another system 10.

Figure 5:
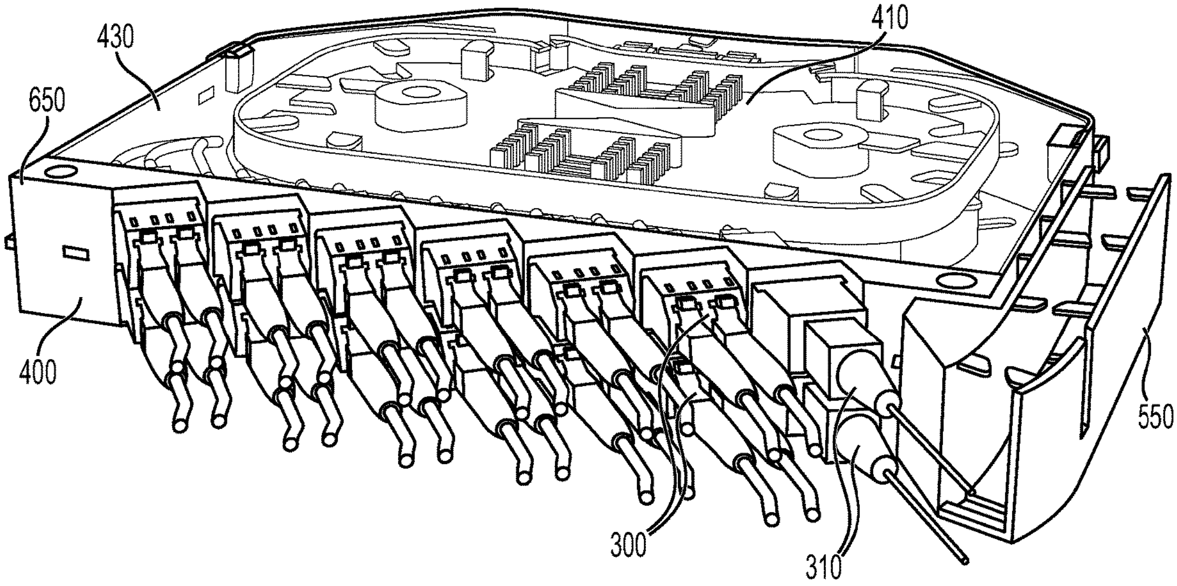
FIG. 5 is a perspective view of a connectorized cassette shown in FIG. 3.

FIG. 5 is a front perspective view of cassette 400. In this example, cassette 400 has a first cassette portion, for example, a cassette base portion, or a cassette base, 430 to which splice tray 410 is mounted. In FIG. 5, splice tray 410 is shown in a closed position in which it covers a large portion of cassette base 430. In this example, output connectors 300 and input connectors 310 are removably attached to second cassette portion, for example, an adapter portion, or an adapter plate, 650 oriented in a left-hand configuration in which the ends of connectors 300, 310 are inserted toward a left side of cassette base 430. Also shown in FIG. 5 is a cable routing portion, for example, a cable manager, 550 that is removably attached to a right side of cassette base 430. As shown below, other examples of cassette 400 use an adapter plate 650 that is oriented in a right-hand configuration in which the ends of connectors 300, 310 are inserted toward a right side of cassette base 430. In these right-hand examples, cable manager 550 that is removably attached to a left side of cassette base 430. In some embodiments, the same adapter plate 650 can be used in both right-hand and left-hand orientations by simply inverting adapter plate 650. In some embodiments, the same cable manager 550 can be used in both right-side and left-side orientations by simply inverting cable manager 550. Providing a splice tray (such as splice tray 410) that is separate from cassette base 430 allows cassette base 430 to be used in both left-hand and right-hand configurations. When no separate splice tray is used, different fiber routing associated with left-hand versus right-hand configurations make it desirable to have different splice locations in cassette base 430 for left-hand and right-hand configurations. As a result, using a separate splice tray allows one cassette base 430 to be used for both left-hand and right-hand configurations.

Figure 6:
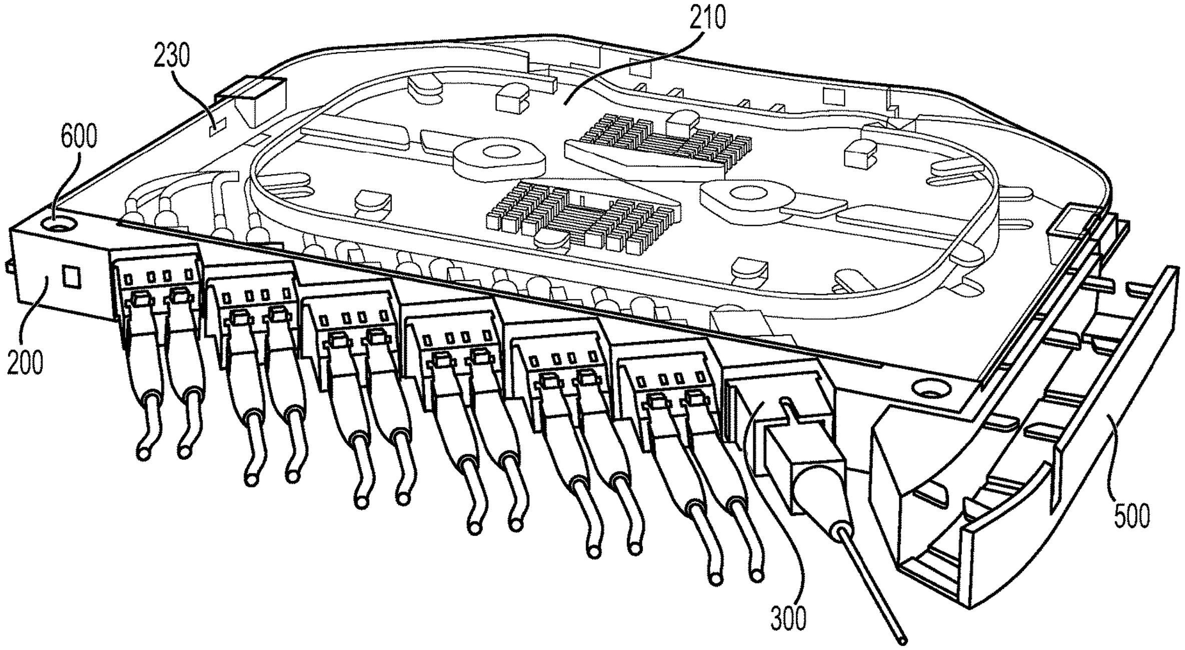
FIG. 6 is a perspective view of a connectorized cassette shown in FIG. 1.

FIG. 6 is a front perspective view of cassette 200. In this example, cassette 200 has a cassette base 230 to which splice tray 210 is mounted. In FIG. 6, splice tray 210 is shown in a closed position in which it covers a large portion of cassette base 230. In this example, output connectors 300 and input connectors 310 are removably attached to an adapter plate 600 oriented in a left-hand configuration in which the ends of connectors 300, 310 are inserted toward a left side of cassette base 230. Also shown in FIG. 6 is a cable manager 500 that is removably attached to a right side of cassette base 230. As shown below, other examples of cassette 200 use an adapter plate 600 that is oriented in a right-hand configuration in which the ends of connectors 300, 310 are inserted toward a right side of cassette base 230. In these right-hand examples, cable manager 500 that is removably attached to a left side of cassette base 230. In some embodiments, the same adapter plate 600 can be used in both right-hand and left-hand orientations by simply inverting adapter plate 600. In some embodiments, the same cable manager 500 can be used in both right-side and left-side orientations by simply inverting cable manager 500.

Figure 7:
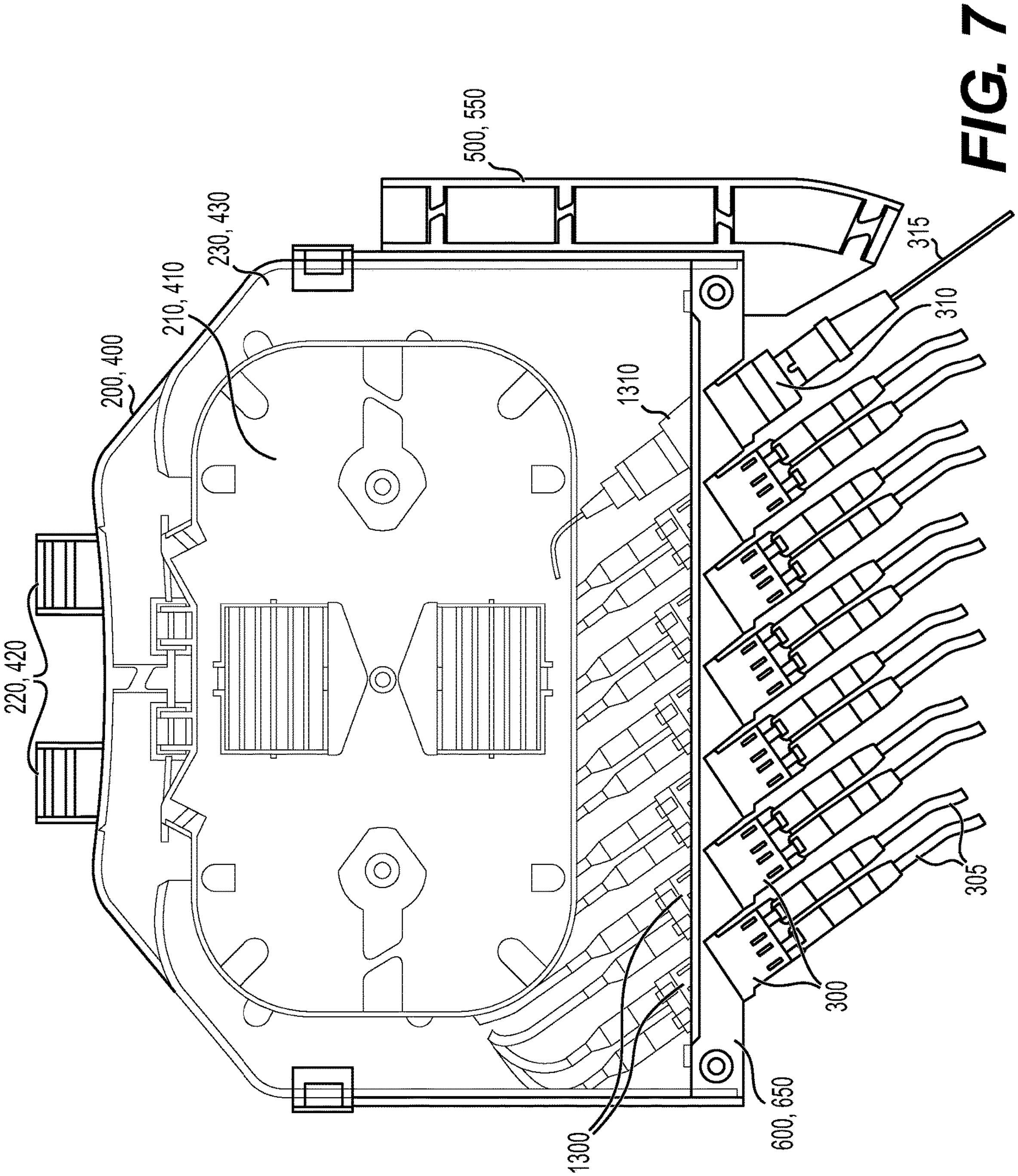
FIG. 7 is a top view of the connectorized cassettes shown in FIGS. 1 and 3.

FIG. 7 is an exemplary top view of cassette 200 shown in FIG. 6, which is also an exemplary top view of cassette 400 shown in FIG. 5. For simplicity, FIG. 7 will be described with reference to cassette 200. The description also applies to cassette 400. Output connectors 300 and input connector 310 are shown connected to adapter plate 600 outside of cassette base 230. Internal output connectors 1300 and internal input connector 1310 are shown connected to adapter plate 600 inside of cassette base 230. In embodiments, adapter plate 600 includes intermediary optical connections that complete an optical connection between an internal output connector 1300 and a corresponding output connector 300. In other embodiments, the optical connections between an internal output connector 1300 and a corresponding output connector 300 are made directly between the internal output connector 1300 and the corresponding output connector 300 and adapter plate 600 provides only a mechanical connection to internal output connectors 1300 and output connectors 300. In embodiments, adapter plate 600 includes intermediary optical connections that complete an optical connection between an internal input connector 1310 and a corresponding input connector 310. In other embodiments, the optical connections between an internal input connector 1310 and a corresponding input connector 310 are made directly between the internal input connector 1310 and the corresponding input connector 310 and adapter plate 600 provides only a mechanical connection to internal input connectors 1310 and input connectors 310.

Figure 8:
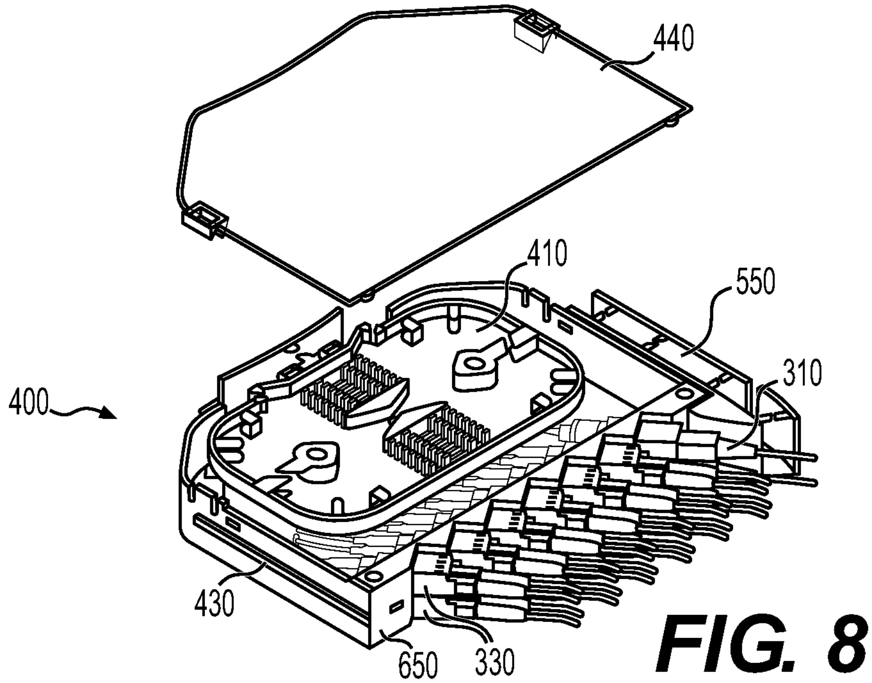
FIG. 8 is a perspective view of the connectorized cassette shown in FIG. 3 with the top removed and the splicing tray in a closed position.

FIG. 8 is a top perspective view of cassette 400 with a cassette top 440 removed from cassette base 430. In this example, cassette top 440 is transparent. In this example, adapter palate 650 is oriented in a left-hand configuration and cable manager 550 is attached to the right side of cassette body 430. FIG. 8 shows splice tray 410 in a closed or down position in which splice tray 410 covers various fiber management features of cassette base 430.

Figure 9:
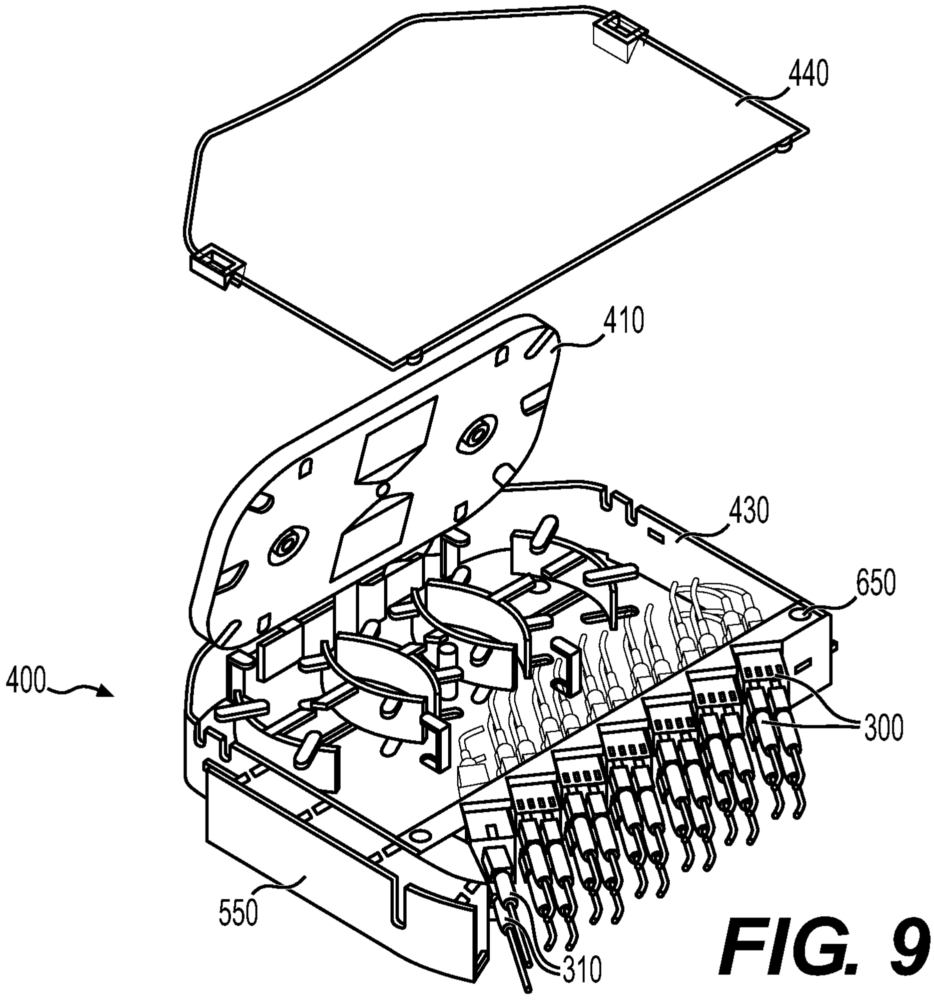
FIG. 9 is a perspective view of the connectorized cassette shown in FIG. 3 with the top removed and the splicing tray in an open position.

FIG. 9 is a top perspective view of cassette 400 with cassette top 440 removed from cassette base 430. In this example, cassette top 440 is transparent. In this example, adapter palate 650 is oriented in a right-hand configuration and cable manager 550 is attached to the left side of cassette body 430. FIG. 9 shows splice tray 410 in an open or tilted-up position in which the various fiber management features of cassette base 430 are accessible to a user.

Figure 10:
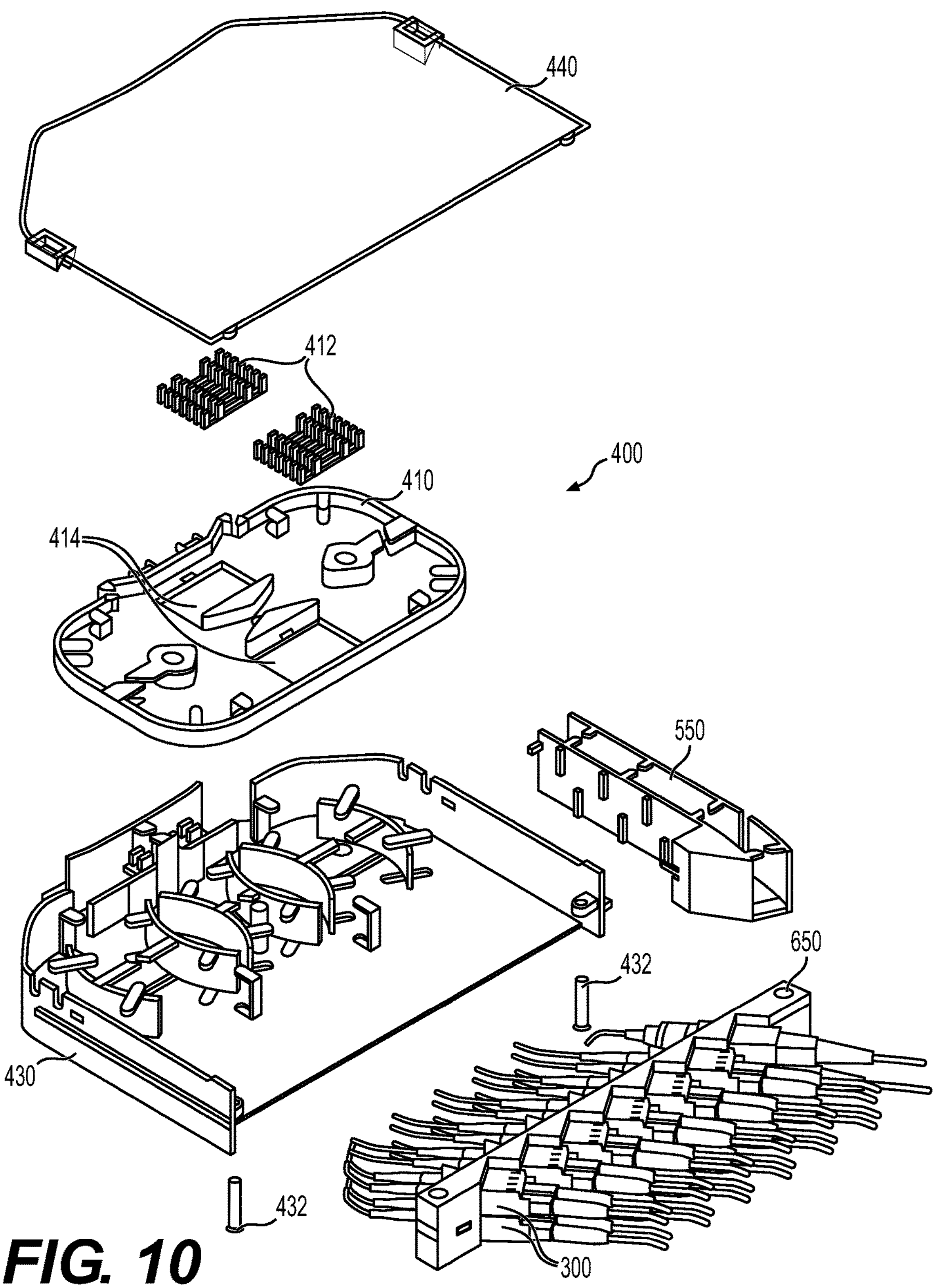
FIG. 10 is an exploded perspective view of the connectorized cassette shown in FIG. 3.

FIG. 10 is an exploded view of an example of cassette 400. In this example, splice tray 410 has two receptacles 414 that each receive a removable/replaceable splice protector holder 412. Receptacles 414 are configured to receive different splice protector holders for different applications (such as different size and/or number of optical fibers). In this example, adapter plate 650 is shown in a left-hand orientation and cable manager 550 is shown on the right side of cassette base 430. In this example, adapter plate 650 is secured to cassette base 430 by two screws 432. To configure cassette 400 with adapter plate 650 in a right-hand orientation, adapter plate 650 can be flipped 180 degrees and secured to cassette base 430 with the same screw 432.

Figure 11:
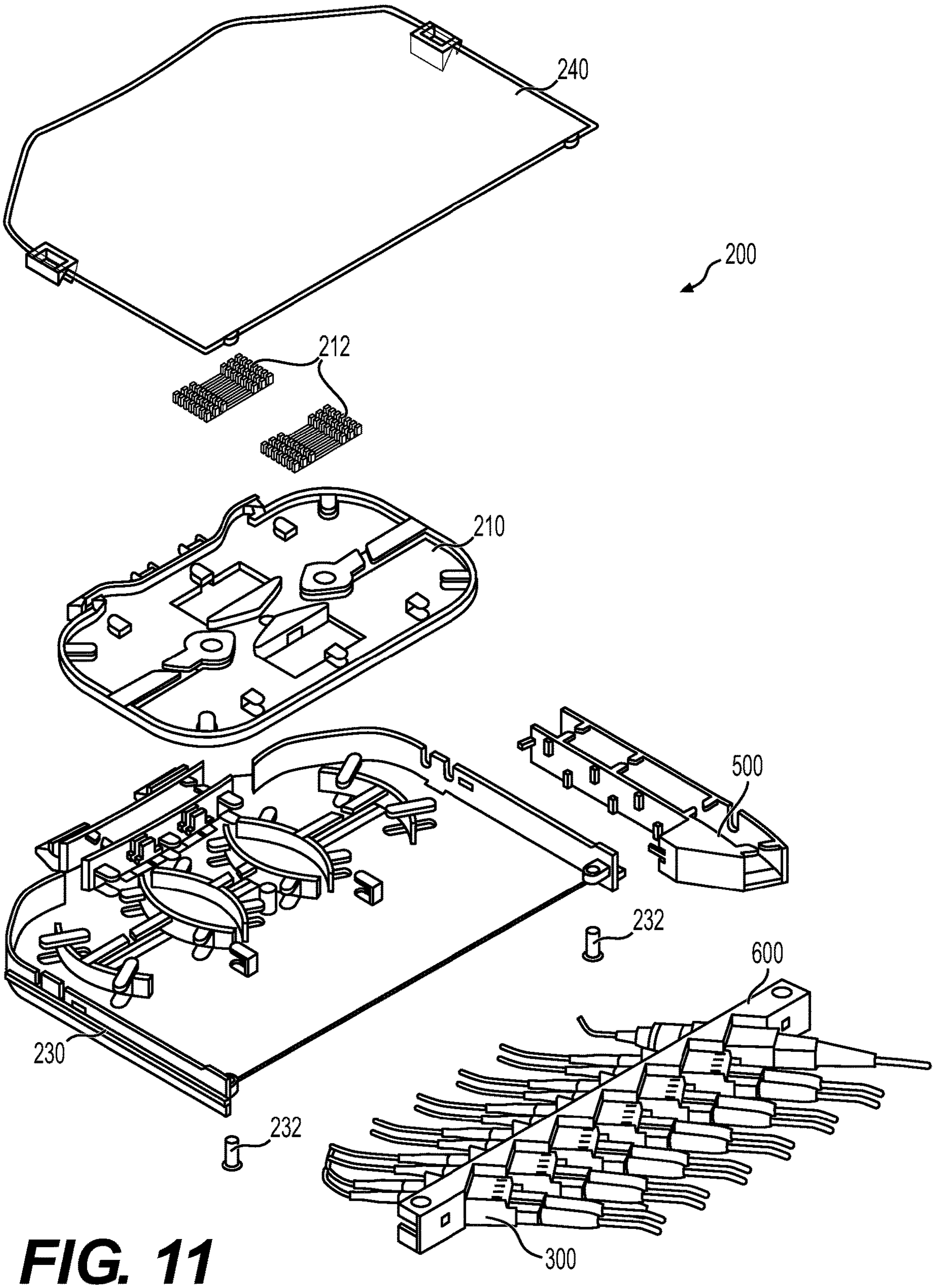
FIG. 11 is an exploded perspective view of the connectorized cassette shown in FIG. 1.

FIG. 11 is an exploded view of an example of cassette 200. In this example, splice tray 210 has two receptacles 214 that each receive a removable/replaceable splice protector holder 212. Receptacles 414 are configured to receive different splice protector holders for different applications (such as different size and/or number of optical fibers). In this example, adapter plate 600 is shown in a left-hand orientation and cable manager 500 is shown on the right side of cassette base 230. In this example, adapter plate 600 is secured to cassette base 230 by two screws 232. To configure cassette 200 with adapter plate 600 in a right-hand orientation, adapter plate 600 can be flipped 180 degrees and secured to cassette base 230 with the same screw 232.

Figure 12:
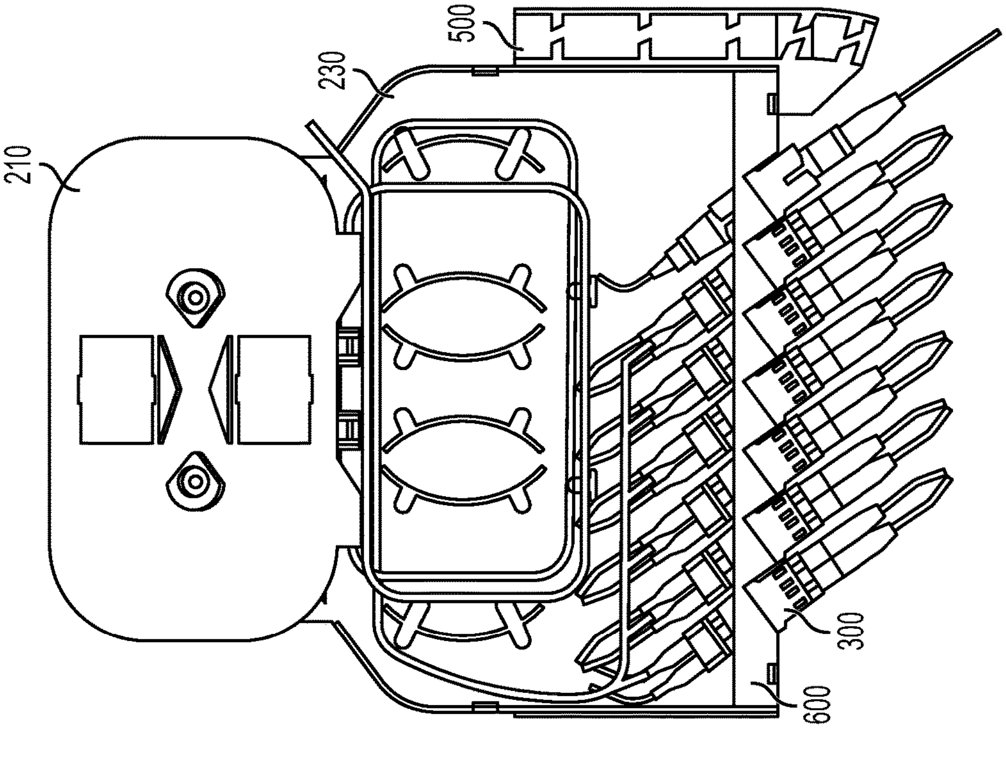
FIG. 12 is a top view of the connectorized cassette shown in FIG. 1 with the splicing tray in an open position.
Figure 13:
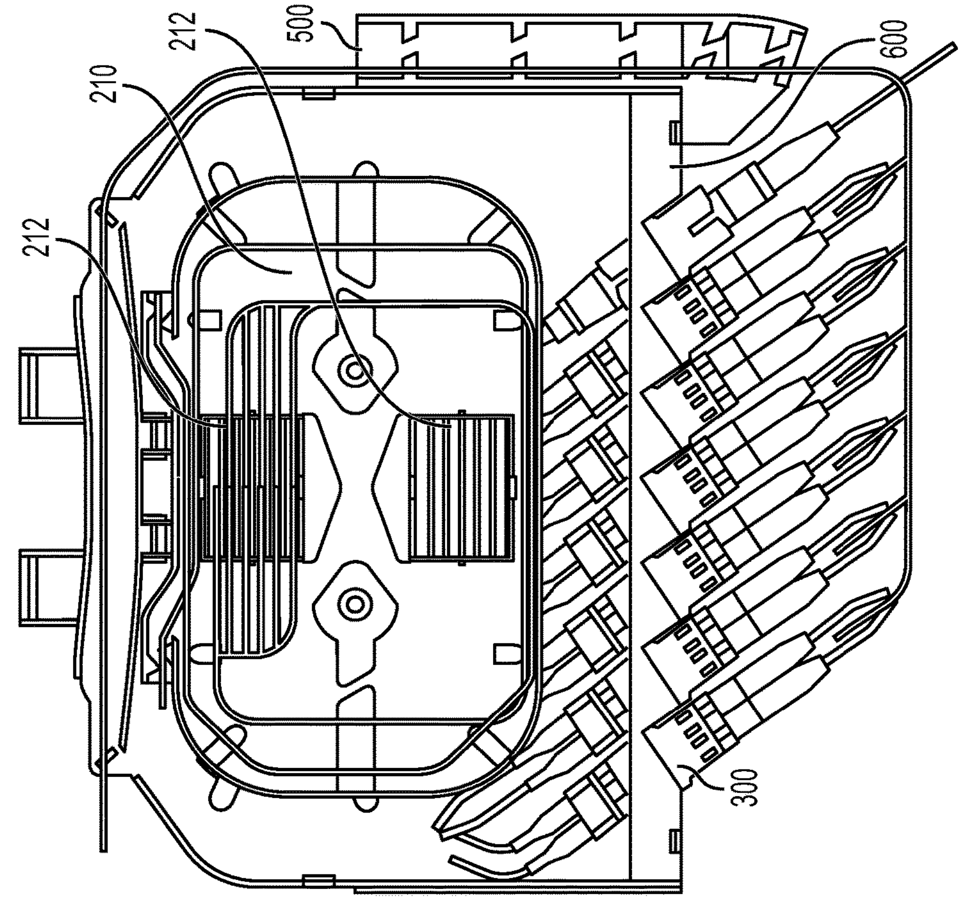
FIG. 13 is a top view of the connectorized cassette shown in FIG. 1 with the splicing tray in a closed position.

FIG. 12 is a top view of cassette 200 with splice tray 210 in the open or flipped up position to provide access to the various fiber management features of cassette base 430. FIG. 13 is a top view of cassette 200 with splice tray 210 in the closed or down position to provide access to splice protector holders 212.

Figure 14:
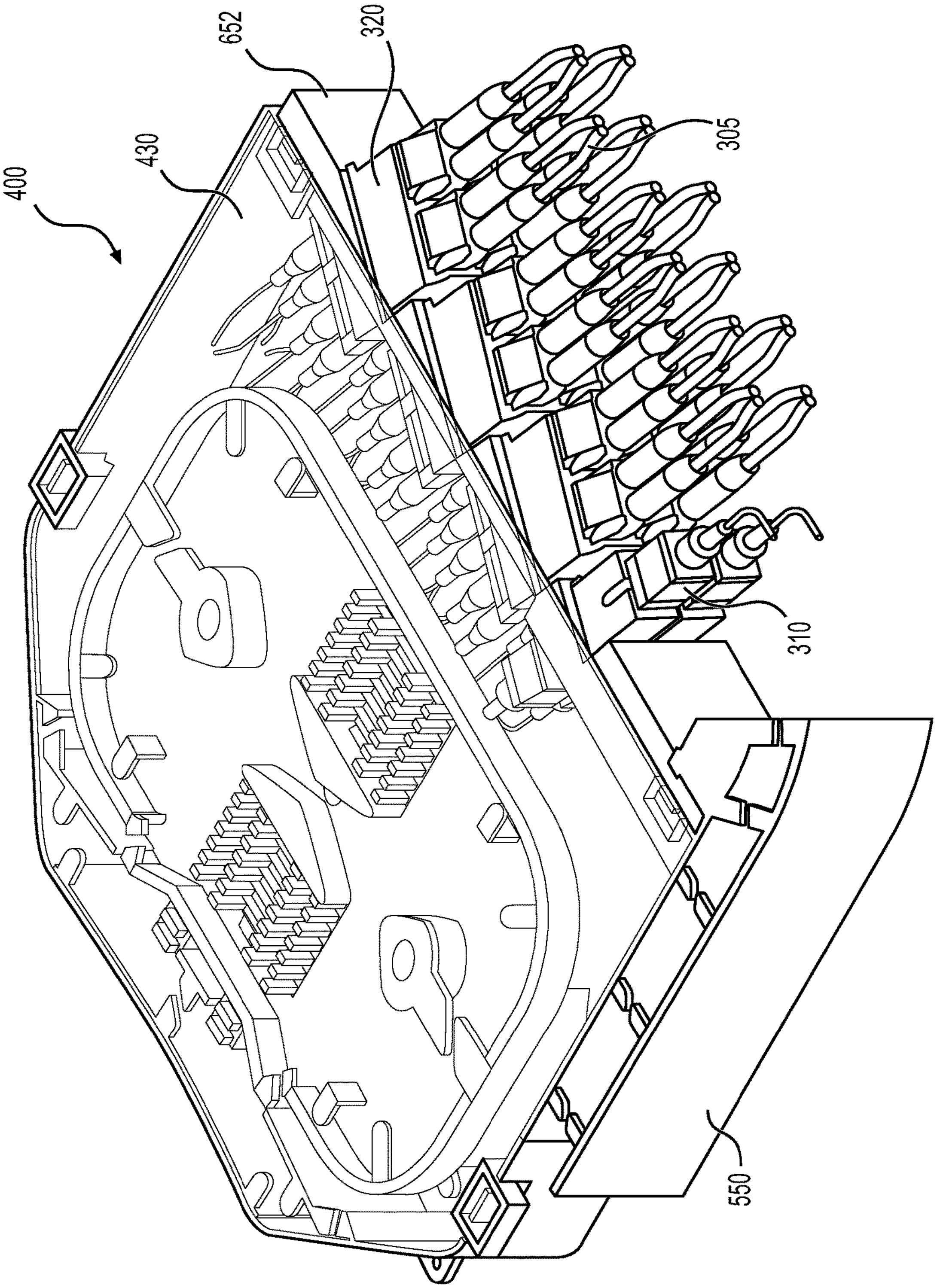
FIG. 14 is a perspective view of a connectorized cassette in accordance with various aspects of the disclosure having an adapter plate configured to receive six quad connectors in a right-hand orientation.
Figure 15:
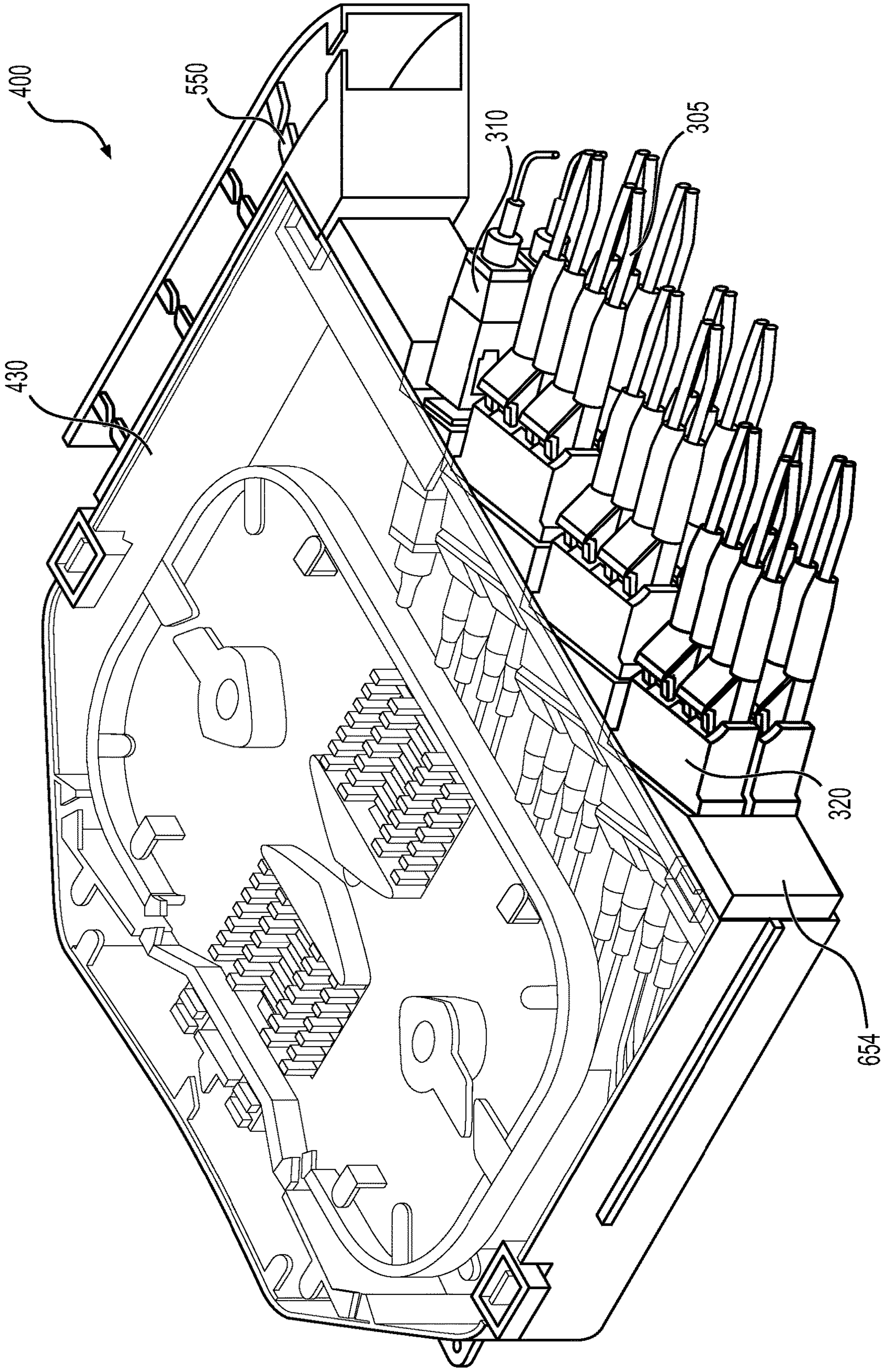
FIG. 15 is a perspective view of a connectorized cassette in accordance with various aspects of the disclosure having an adapter plate configured to receive six quad connectors in a left-hand orientation.

FIG. 14 is a perspective view of an example of cassette 400 with an adapter plate 652 installed in cassette base 430. In this example, adapter plate 652 is configured in a right-hand configuration to receive six quad output connectors 320 for a total of 24 output cables 305. FIG. 15 is a perspective view of an example of cassette 400 with an adapter plate 654 installed in cassette base 430. In this example, adapter plate 654 is configured in a left-hand configuration to receive six quad output connectors 320 for a total of 24 output cables 305. Left-hand adapter plate 654 in this example is a different part from right-hand adapter plate 652. In embodiments, the configuration shown in FIG. 15 can be achieved by simply flipping adapter plate 652 from the position shown in FIG. 14 to the position shown in FIG. 15. Cable manager 550 shown in FIG. 15 is a different part from cable manager 550 shown in FIG. 14 in that both cable managers 550 have openings on their top sides to allow cables to be pressed into cable manager 550, whereas both cable managers 550 have solid bottoms.

Figure 16:
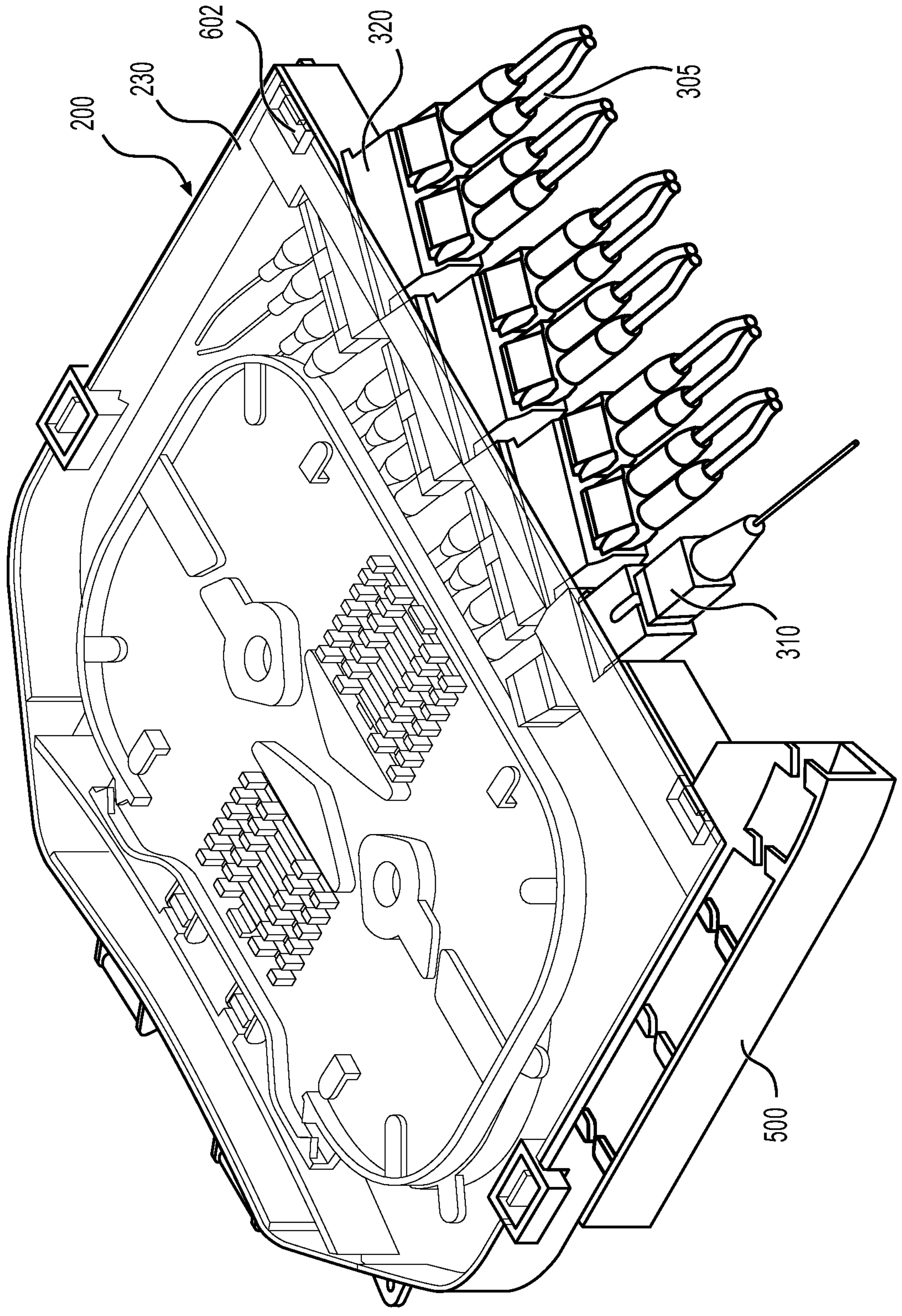
FIG. 16 is a perspective view of a connectorized cassette in accordance with various aspects of the disclosure having an adapter plate configured to receive three quad connectors in a right-hand orientation.
Figure 17:
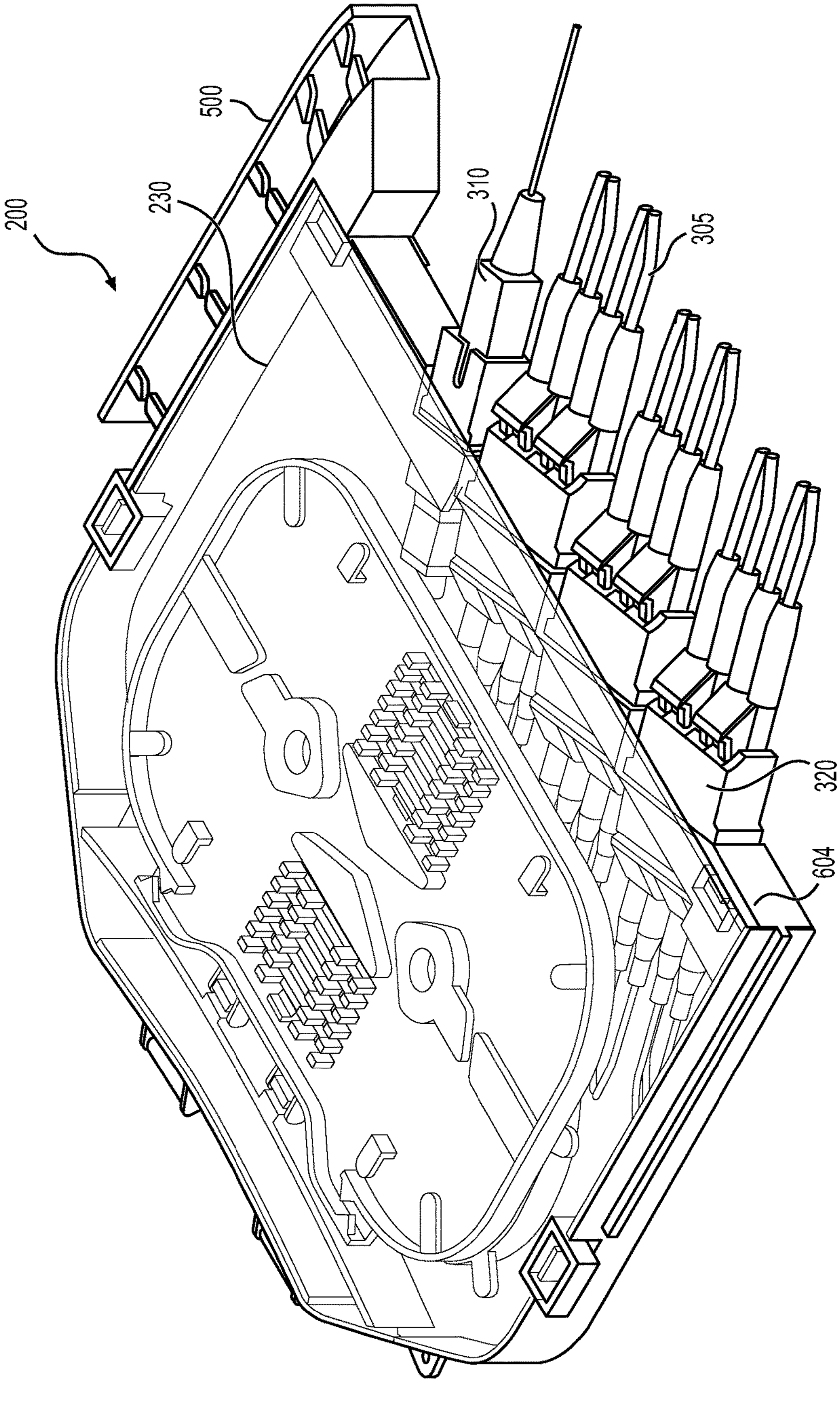
FIG. 17 is a perspective view of a connectorized cassette in accordance with various aspects of the disclosure having an adapter plate configured to receive three quad connectors in a left-hand orientation.

FIG. 16 is a perspective view of an example of cassette 200 with an adapter plate 602 installed in cassette base 230. In this example, adapter plate 602 is configured in a right-hand configuration to receive three quad output connectors 320 for a total of 12 output cables 305. FIG. 17 is a perspective view of an example of cassette 200 with an adapter plate 604 installed in cassette base 230. In this example, adapter plate 604 is configured in a left-hand configuration to receive three quad output connectors 320 for a total of 12 output cables 305. Left-hand adapter plate 604 in this example is a different part from right-hand adapter plate 602. In embodiments, the configuration shown in FIG. 17 can be achieved by simply flipping adapter plate 602 from the position shown in FIG. 16 to the position shown in FIG. 17. Cable manager 500 shown in FIG. 17 is a different part from cable manager 500 shown in FIG. 16 in that both cable managers 500 have openings on their top sides to allow cables to be pressed into cable manager 500, whereas both cable managers 500 have solid bottoms.

Figure 18:
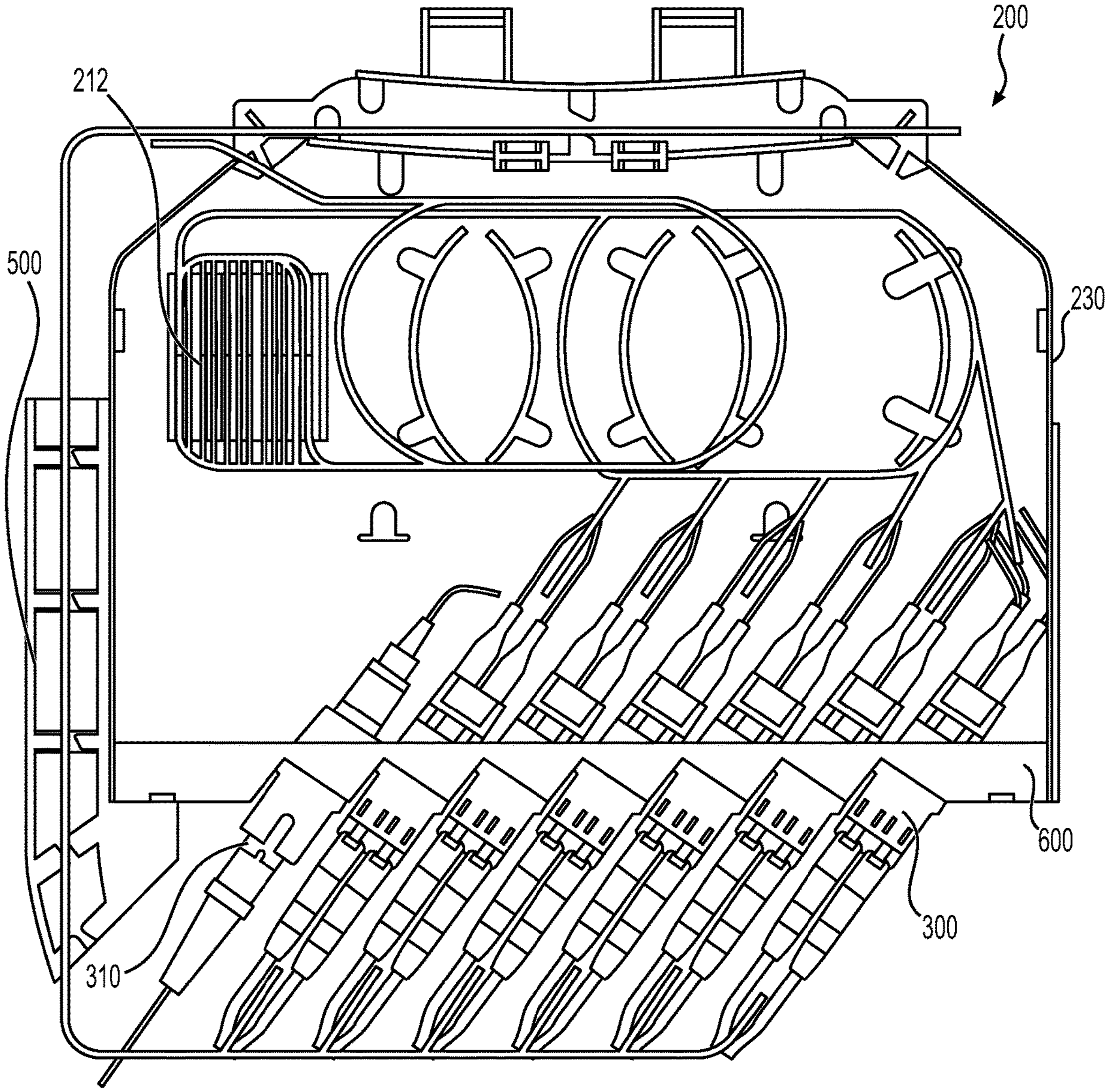
FIG. 18 is a top view of a connectorized cassette in accordance with various aspects of the disclosure having an adapter plate configured to receive six dual connectors in a right-hand orientation.
Figure 19:
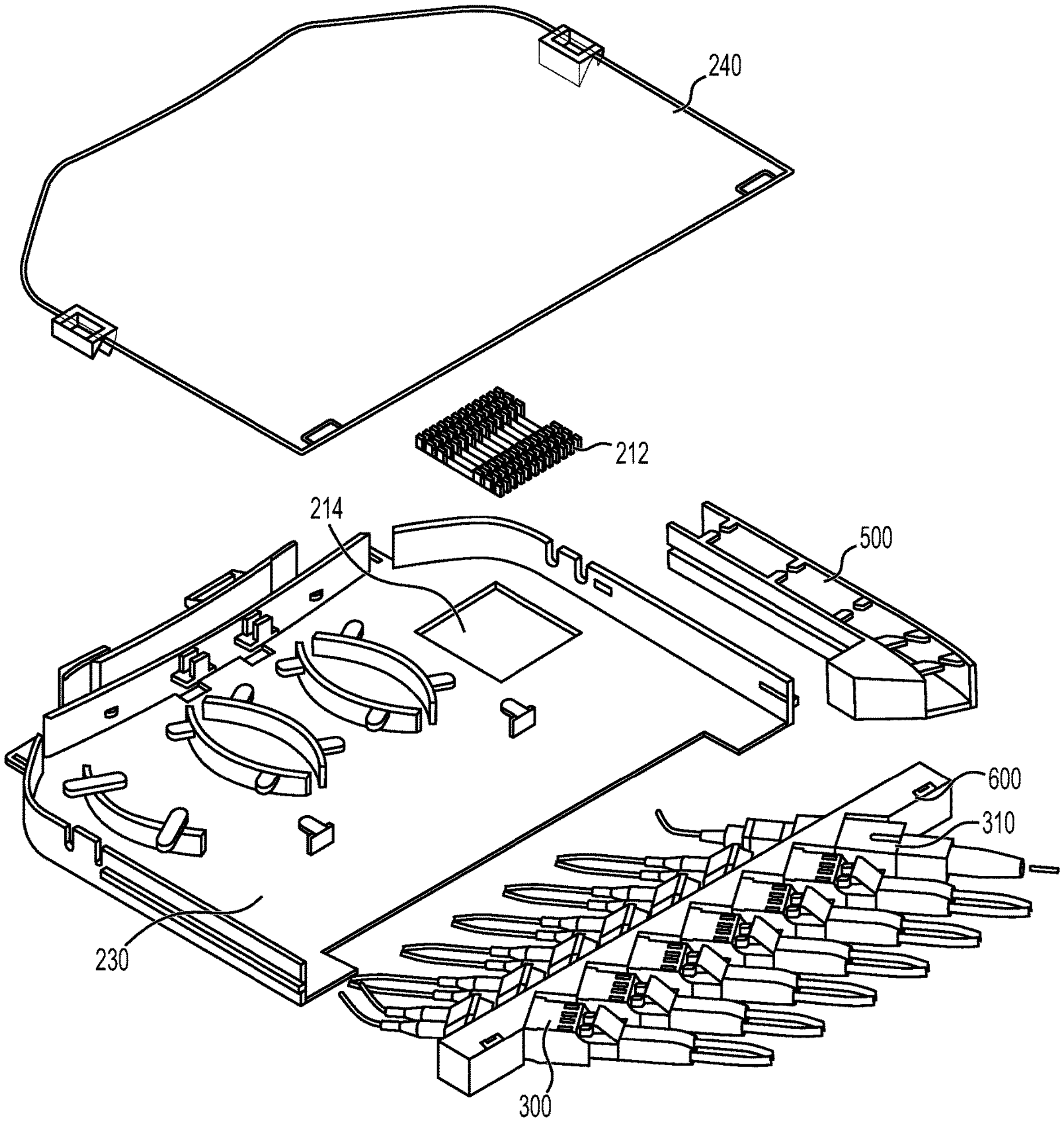
FIG. 19 is an exploded perspective view of the connectorized cassette of FIG. 18 with an adapter plate configured to receive six dual connectors in a left-hand orientation.

FIG. 18 is a top view of a cassette 200 having one removable/replaceable splice protector holder 212 mounted in cassette base 230 and (unlike the examples shown in FIG. 6) not having a separate splice tray. In this example, adapter plate 600 is positioned in the right-hand orientation. FIG. 19 is an exploded perspective view of the example of cassette 200 shown in FIG. 18, but with adapter plate 600 positioned in the left-hand orientation.

Figure 20:
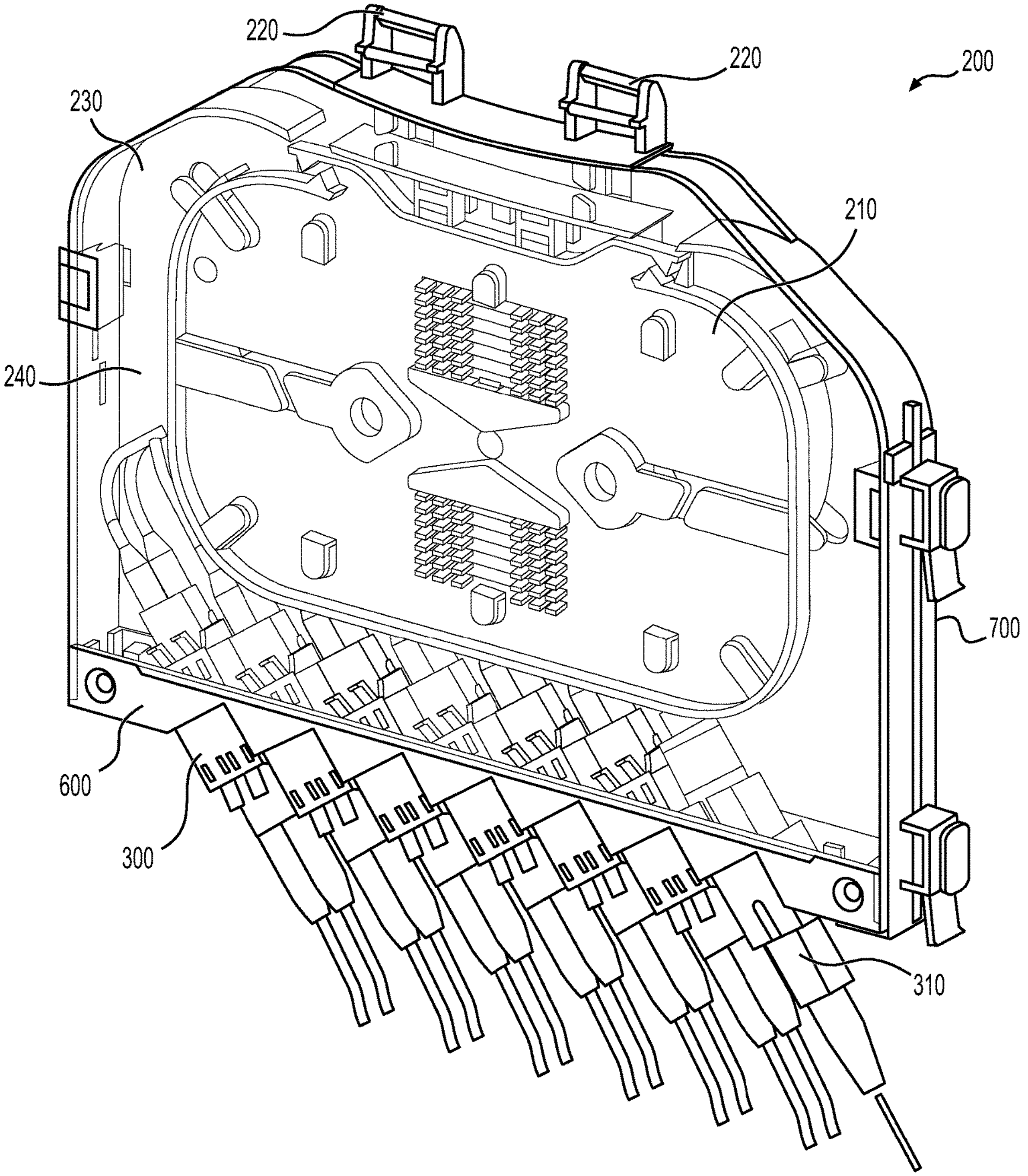
FIG. 20 is a front right perspective view of a connectorized cassette in accordance with various aspects of the disclosure.
Figure 21:
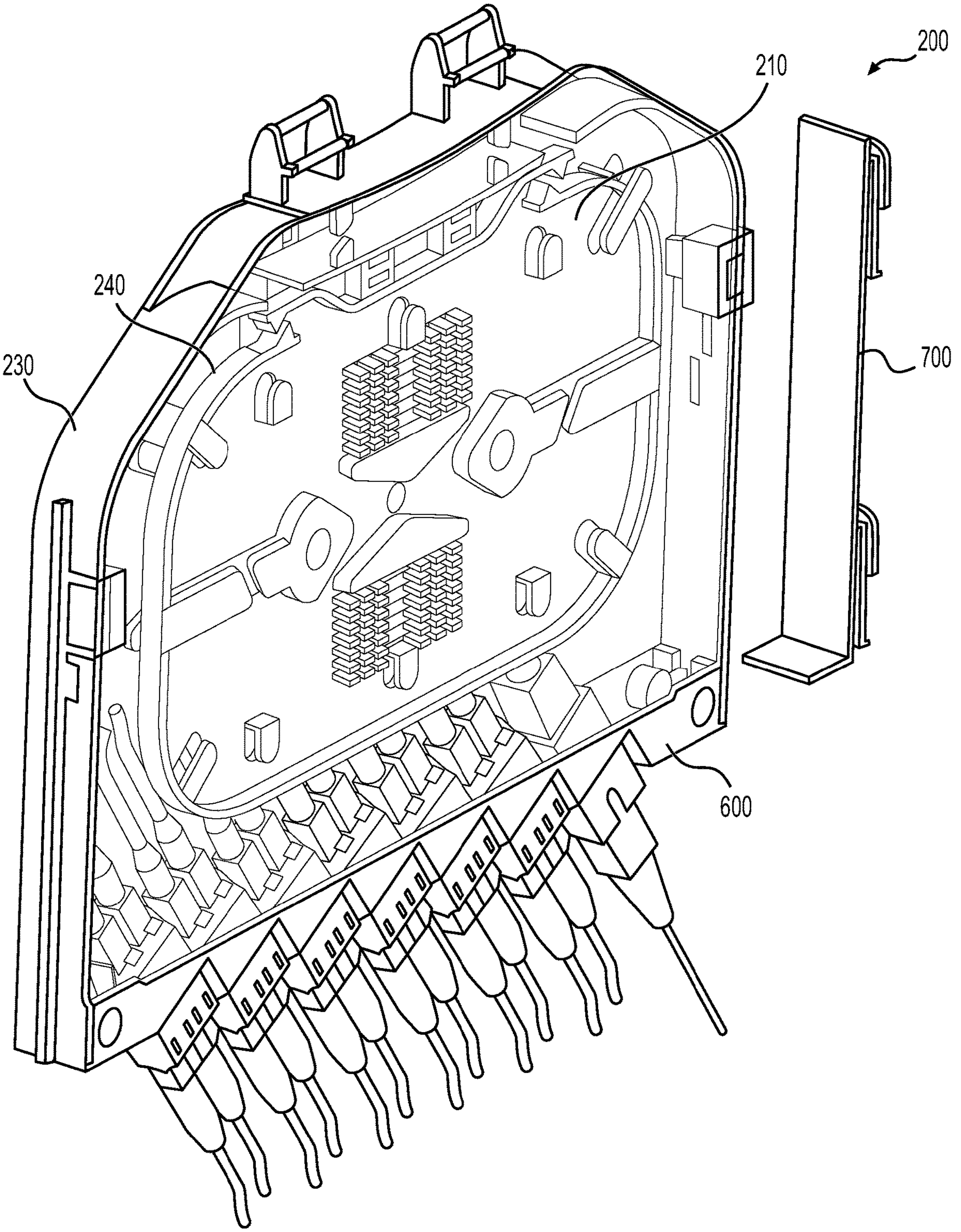
FIG. 21 is a left front perspective view of connectorized cassette of FIG. 20.

FIG. 20 shows an embodiment of cassette 200 configured to be mounted in a vertical orientation using a vertical mounting bracket 700 attached to the right side of cassette base 230. FIG. 21 shows the example of cassette 200 shown in FIG. 20 with vertical mounting bracket 700 detached from cassette base 230. Vertical mounting bracket 700 can be attached to either the right side (as shown in FIG. 20) or the left side of cassette base 230. In embodiments, vertical mounting bracket 700 can be removed and reinstalled on the same or the opposite side of cassette base 230. A vertical mounting bracket similar to vertical mounting bracket 700, but wider, can be attached to the various examples of cassette 400 shown in the disclosure (and other embodiments) to configure cassette 400 for vertical mounting. Vertical mounting bracket 700 can be attached to the various examples of cassette 200 shown in the disclosure (and other embodiments) to configure cassette 200 for vertical mounting. In embodiments, vertical mounting bracket 700 is removably attachable to either side of cassette 200, 400 using clips, protrusions, and/or other attachment features.

Figure 22:
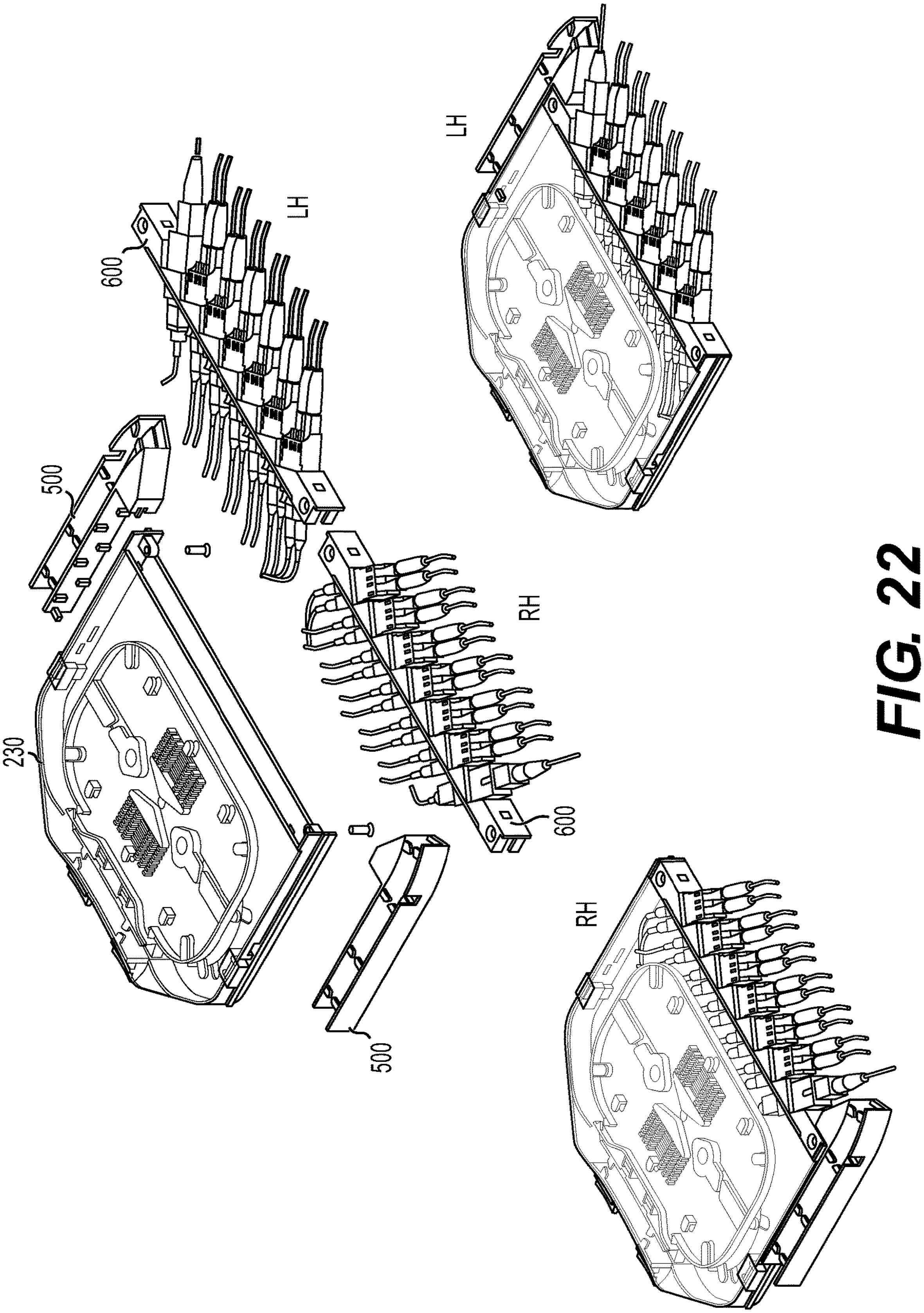
FIG. 22 is a perspective view of a connectorized cassette in accordance with various aspects of the disclosure shown with both a left oriented adapter plate and a right oriented adapter plate.

FIG. 22 shows an example of cassette base 230 being configured with both right-hand and left-hand orientations to exhibit the modular nature and simple configurability (and reconfigurability) of cassette 200. Cassette 400 is similarly configurable and reconfigurable.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. An optical fiber cassette structurally configured to enhance fiber management in an optical fiber management system, comprising:

a base portion that is structurally configured to receive fiber optic cables;

an adapter portion structurally configured to be coupled with and removed from the base portion;

a splice tray structurally configured to be mounted to the base portion and structurally configured to be movable between an open position and a closed position;

a cable routing portion structurally configured to be attached to and removed from the base portion;

wherein the base portion is structurally configured to attach to the cable routing portion at multiple locations on the base portion;

wherein the base portion is structurally configured to be coupled with a cassette mount such that the cassette pivots relative to the cassette mount;

wherein the adapter portion includes a first configuration of ports that are structurally configured to receive fiber optic connectors;

wherein the adapter portion comprises an input adapter to optically connect an internal input connector of the fiber optic connectors to an external input connector of the fiber optic connectors;

wherein the adapter portion is structurally configured to be coupled with the base portion in different orientations;

wherein the base portion is structurally configured to be coupled with an alternate adapter portion that is structurally configured to be coupled with and removed from the base portion, and that includes a second configuration of ports that are structurally configured to receive fiber optic connectors;

wherein the second configuration is different from the first configuration; and wherein the base portion is structurally configured to alternatively receive the adapter portion and the alternate adapter portion in a selected orientation such that the base portion, the adapter portion, and the alternate adapter portion provide a modular system that permits customization of the cassette so as to enhance optical fiber cable connection and management.

2. An optical fiber management system configured to secure incoming and outgoing connectorized optical cables containing optical fibers, separate and route the optical fibers, organize splicing of the optical fibers, and provide access to the optical fibers before and after splicing, the system comprising:

a cable fixation plate;

a fiber entry and storage plate located above and attached to the cable fixation plate;

a cassette mount located above and structurally configured to be attached to the fiber entry and storage plate, the cassette mount having attachment members structurally configured to receive a plurality of cassettes; and the cassette of claim 1.

3. The cassette of claim 1, wherein the adapter portion comprises an output adapter to optically connect an internal output connector to an external output connector.

4. The cassette of claim 1, wherein the different orientations include a left-hand orientation and a right-hand orientation.

5. The cassette of claim 1, wherein the cassette further comprises a cover structurally configured to be mounted to the base portion and structurally configured to be movable between an open position and a closed position.

6. The cassette of claim 1, wherein the base portion is structurally configured to alternately receive first adapter portion in a first orientation and a second orientation, wherein the second orientation is 180 degrees relative to the first orientation.

7. The cassette of claim 1, wherein the adapter portion is structurally configured to receive an external one of the fiber optic connectors at an angle relative to a longitudinal direction of first adapter portion, wherein the angle is between 0 and 90 degrees.

8. The cassette of claim 7, wherein the adapter portion is structurally configured to receive an internal one of the fiber optic connectors at the angle relative to the longitudinal direction of the adapter portion.

9. An optical fiber cassette structurally configured to enhance fiber management in an optical fiber management system, comprising:

a base portion that is structurally configured to receive fiber optic cables;

an adapter portion structurally configured to be coupled with and removed from the base portion;

a splice tray structurally configured to be mounted to the base portion and structurally configured to be movable between an open position and a closed position;

wherein the base portion is structurally configured to be coupled with a cassette mount such that the cassette pivots relative to the cassette mount;

wherein the adapter portion is structurally configured to receive fiber optic connectors;

wherein the adapter portion is structurally configured to be coupled with the base portion in different orientations;

wherein the base portion is structurally configured to be coupled with an alternate adapter portion that is structurally configured to be removably coupled with and removed from the base portion, and that includes a second configuration of ports that are structurally configured to receive fiber optic connectors;

wherein the second configuration is different from the first configuration; and wherein the base portion is structurally configured to alternatively receive the adapter portion and the alternate adapter portion in a selected orientation such that the base portion, the adapter portion, and the second adapter portion provide a modular system that permits customization of the cassette so as to enhance optical fiber cable connection and management.

10. The cassette of claim 9, wherein the cassette further comprises a cable routing portion structurally configured to be attached to and removed from the base portion.

11. The cassette of claim 10, wherein the base portion is structurally configured to attach to the cable routing portion at multiple locations on the base portion.

12. The cassette of claim 9, wherein the adapter portion comprises an input adapter to optically connect an internal input connector of the fiber optic connectors to an external input connector of the fiber optic connectors.

13. The cassette of claim 12, wherein the internal input connector terminates an internal input optical cable that is located inside the base portion.

14. The cassette of claim 9, wherein the adapter portion comprises an output adapter to optically connect an internal output connector of the fiber optic connectors to an external output connector of the fiber optic connectors.

15. The cassette of claim 14, wherein the internal output connector terminates an internal output optical cable that is located inside the base portion.

16. The cassette of claim 9, wherein the cassette base is structurally configured to alternately receive the adapter portion in a first orientation and a second orientation, wherein the second orientation is 180 degrees relative to the first orientation.

17. The cassette of claim 9, wherein the adapter portion is structurally configured to receive one of the optical fiber connectors at an angle relative to a longitudinal direction of the adapter plate, wherein the angle is between 0 and 90 degrees.

18. A device for providing enhanced fiber optic cable connectivity and/or management in a fiber distribution assembly during operation, comprising:

an enhanced fiber optic cassette assembly comprising:

a first cassette portion that is structurally arranged to receive fiber optic cables during operation;

a second cassette portion structurally arranged to be coupled with the first cassette portion in different orientations and removed therefrom during operation;

wherein the first cassette portion is structurally arranged to be coupled with an alternate second cassette portion that is structurally arranged to be coupled with and removed from the first cassette portion during operation;

wherein the first cassette portion is structured and arranged to be coupled with a cassette mount such that the cassette is permitted to pivot relative to the cassette mount during operation; and wherein the enhanced fiber optic cassette assembly is structured and arranged to provide enhanced fiber optic cable connectivity and/or management by permitting the first cassette portion to alternatively receive the second cassette portion and the alternate second cassette portion in a selected orientation so as to provide a modular assembly that permits customization of the device during operation.

19. The device of claim 18, wherein the device further comprises a splice tray structurally arranged to be mounted to the first cassette portion and structurally arranged to be movable between an open position and a closed position.

20. The device of claim 18, wherein the second cassette portion is structurally arranged to receive fiber optic connectors.

21. The device of claim 18, wherein the first cassette portion is a cassette base portion.

22. The device of claim 18, wherein the second cassette portion is an adapter portion.

23. The device of claim 18, wherein the second cassette portion is structurally arranged to receive an internal input connector terminating an internal input optical cable.

24. The device of claim 23, wherein the second cassette portion comprises an input adapter to optically connect the internal input connector to an external input connector.

25. The device of claim 18, wherein the first cassette portion is structurally arranged to alternately receive the second cassette portion in a first orientation and a second orientation, wherein the second orientation is 180 degrees relative to the first orientation.

26. The device of claim 18, wherein the second cassette portion is structurally arranged to receive an external input connector at an angle relative to a longitudinal direction of the second cassette portion, wherein the angle is between 0 and 90 degrees.

27. A device for providing enhanced fiber optic cable connectivity and/or management in a fiber distribution assembly during operation, comprising:

an enhanced fiber optic cassette assembly comprising:

a first cassette portion that is structurally arranged to receive fiber optic cables during operation;

a second cassette portion structurally arranged to be coupled with the first cassette portion in different orientations and removed therefrom during operation;

wherein the first cassette portion is structurally arranged to be coupled with an alternate second cassette portion that is structurally arranged to be coupled with and removed from the first cassette portion during operation;

wherein the device further comprises a cable routing portion, the cable routing portion is structurally arranged to attach to and be removed from the first cassette portion, and the first cassette portion is structurally arranged to attach to the cable routing portion at multiple locations on the first cassette portion; and wherein the enhanced fiber optic cassette assembly is structurally arranged to provide enhanced fiber optic cable connectivity and/or management by permitting the first cassette portion to alternatively receive the second cassette portion and the alternate second cassette portion in a selected orientation so as to provide a modular assembly that permits customization of the device during operation.

28. The device of claim 27, wherein the first cassette portion is structurally arranged to be coupled with a device mount such that the device pivots relative to the device mount.

* * * * *